(12) United States Patent
Strothmann et al.

(10) Patent No.: US 12,014,531 B2
(45) Date of Patent: Jun. 18, 2024

(54) METHOD FOR CONTROLLING THE OPERATION OF A MACHINE FOR HARVESTING ROOT CROP

(71) Applicant: Grimme Landmaschinenfabrik GmbH & Co. KG, Damme (DE)

(72) Inventors: Wolfram Strothmann, Osnabrück (DE); Daniel Bösenberg, Emsdetten (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 381 days.

(21) Appl. No.: 17/287,055

(22) PCT Filed: Nov. 5, 2019

(86) PCT No.: PCT/EP2019/080263
§ 371 (c)(1),
(2) Date: Apr. 20, 2021

(87) PCT Pub. No.: WO2020/094654
PCT Pub. Date: May 14, 2020

(65) Prior Publication Data
US 2021/0378167 A1 Dec. 9, 2021

(30) Foreign Application Priority Data
Nov. 7, 2018 (DE) .......................... 102018127844.6

(51) Int. Cl.
*G06V 10/56* (2022.01)
*A01D 17/10* (2006.01)
(Continued)

(52) U.S. Cl.
CPC ............. *G06V 10/56* (2022.01); *A01D 17/10* (2013.01); *A01D 33/00* (2013.01); *G06F 18/24* (2023.01);
(Continued)

(58) Field of Classification Search
CPC ...... G06V 10/56; G06V 10/255; G06V 20/68; G06V 2201/06; A01D 17/10; A01D 33/00;
(Continued)

(56) References Cited

U.S. PATENT DOCUMENTS 6,119,441 A * 9/2000 Lipes .................... B65B 43/267
53/384.1
6,119,442 A * 9/2000 Hale .................... A01D 41/127
56/10.2 H
(Continued)

FOREIGN PATENT DOCUMENTS

EP          1763988 A1     3/2007
JP        2007112603 A     5/2007
(Continued)

OTHER PUBLICATIONS

Mallahi, Ahmad Ali et al., "Improving the Conditions of Potato Production by the Automation of Potato Harvesting Tasks Using Machine Vision", In: Potatoes: Production, Consumption and Health Benefits, 2012, p. 83-97, ISBN: 978-1-692100-703-6.
(Continued)

*Primary Examiner* — Tyler D Paige
(74) *Attorney, Agent, or Firm* — Husch Blackwell LLP

(57) ABSTRACT

A method is provided for controlling the operation of a machine for harvesting root crop. At least one optical image-capturing unit captures at least one test image of harvested material comprising root crop which is moved along relative to a machine frame by means of at least one conveyor element. A conveying speed of the conveyor element is set on the basis of a test data set which is generated using the test image or formed by means of the latter. An evaluation device generates, on the basis of the test
(Continued)

data set, a conveying speed signal, independent of a speed of the harvested material, for setting the conveying speed.

32 Claims, 15 Drawing Sheets

(51) Int. Cl.
*A01D 33/00* (2006.01)
*G06F 18/24* (2023.01)
*G06T 7/00* (2017.01)
*G06V 10/20* (2022.01)
*G06V 20/68* (2022.01)

(52) U.S. Cl.
CPC ............ *G06T 7/001* (2013.01); *G06V 10/255* (2022.01); *A01D 2017/105* (2013.01); *G06T 2207/30128* (2013.01); *G06V 20/68* (2022.01)

(58) Field of Classification Search
CPC ........ A01D 2017/105; A01D 2033/005; G06F 18/24; G06T 7/001; G06T 2207/30128
USPC .......................................................... 701/50
See application file for complete search history.

(56) References Cited

U.S. PATENT DOCUMENTS

| 6,484,810 | B1 * | 11/2002 | Bendix .................. A01D 23/04 171/110 |
| 2007/0056258 | A1 * | 3/2007 | Behnke .............. A01D 41/1277 56/10.2 R |
| 2018/0042176 | A1 | 2/2018 | Obropta |
| 2018/0047177 | A1 * | 2/2018 | Obropta .................. G06T 17/20 |
| 2019/0289773 | A1 * | 9/2019 | Prystupa .............. A01B 79/005 |
| 2019/0289774 | A1 * | 9/2019 | Prystupa ................ A01C 7/105 |

FOREIGN PATENT DOCUMENTS

| JP | 2015199568 A | 11/2015 |
| JP | 2016080515 A | 5/2016 |
| WO | 2014/037290 A1 † | 3/2014 |
| WO | 2014037290 A1 | 3/2014 |
| WO | WO 2014/037290 | 3/2014 |

OTHER PUBLICATIONS

Molema, Geert-Jan et al., "Using Image Processing to Measure Potato Yield", Article: Agricultural Mechanisation, Apr. 2003, p. 58-61.

Molema, G.J., Hofstee, J.W., 2003, Aardappelopbrengst meten met beeldverwerking kan. Landbouwmechanisatie, Apr. 2003, pp. 28-29.†

Mallahi, A. A., Kataoka, T., 2012, Improving The Conditions of Potato Production by the Automation of Potato Harvesting Tasks Using Machine Vision.Potatoes: Production, Consumption and Health Benefits, ISBN: 978-1-62100-703-6, Nova Science Publishers, Inc., pp. 83-97.†

\* cited by examiner
† cited by third party

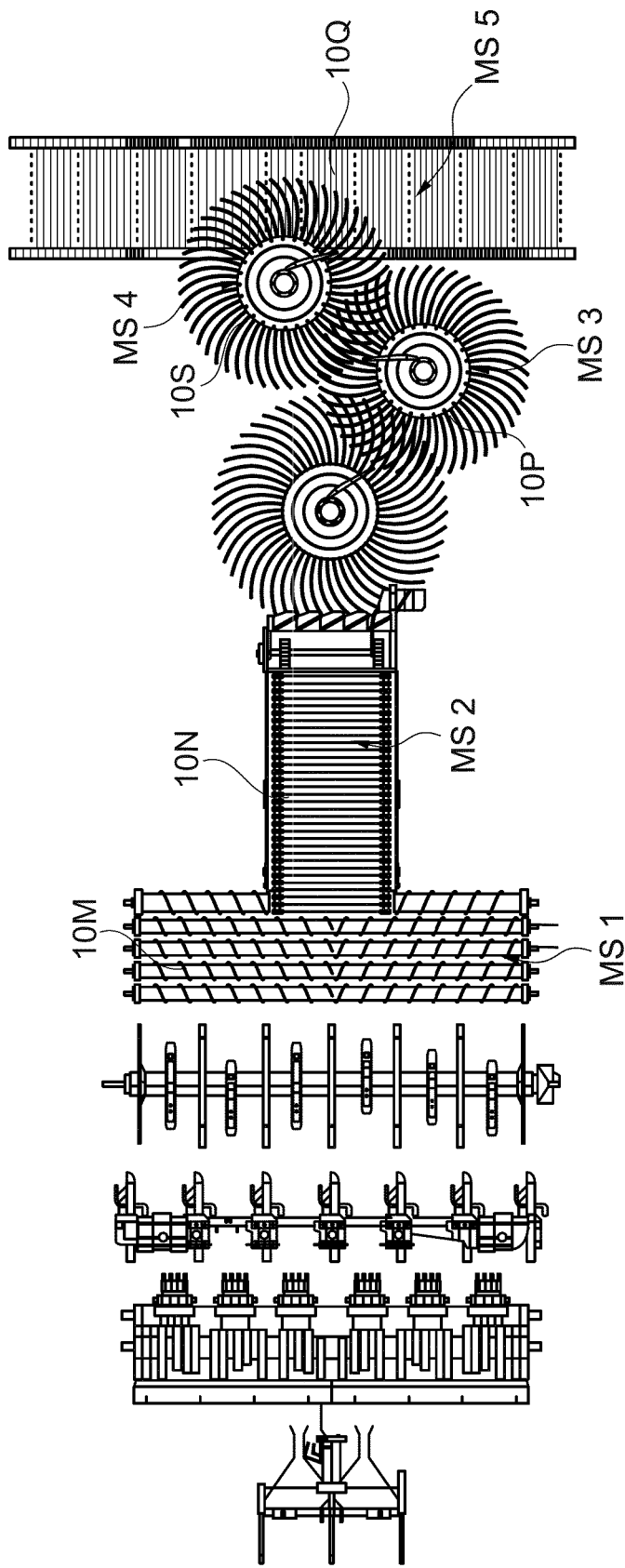

METHOD FOR CONTROLLING THE OPERATION OF A MACHINE FOR HARVESTING ROOT CROP

CROSS REFERENCE

This application claims priority to PCT Application No. PCT/EP2019/080263, filed Nov. 5, 2019, which itself claims priority to German Application No. 10 2018 127844.6, filed Nov. 7, 2018, the entirety of both of which is hereby incorporated by reference.

FIELD OF THE INVENTION

The invention relates to a method for controlling the operation of a machine for harvesting root crop and to the machine. In the method, at least one optical image-capturing unit captures at least one test image of harvested material which is moved along relative to a machine frame by means of at least one conveyor element. The harvested material comprises root crop. A conveying speed of the conveyor element is set on the basis of a test dataset which is generated using the test image and formed by means of the latter.

The test image represents harvested material which has been previously picked up by the machine for harvesting root crop. The conveyor element as part of the machine serves here to move along the harvested material within the machine, and at least part of the harvested material is in direct contact with the conveyor element here. The conveying speed at which the conveyor element is moved is set with the test data set.

BACKGROUND OF THE INVENTION

Laid-open patent application US 2018/0047177 A1 discloses a method in which the test image is used to determine a speed of the conveyor element. The conveying speed of the conveyor element is adapted on the basis of this determined speed.

It is disadvantageous in the known methods of the generic type that depending on the harvesting conditions, associated separating devices cause significant damage to the root crop or to a large quantity of extraneous materials among root crop which are unloaded from the machine. It is therefore also generally proposed in US 2018/0047177 A1 to change the harvesting rate or one or more configurations of the machine in accordance with a server-based evaluation of three-dimensional data of the harvested material which is recorded by the sensors of the machine.

BRIEF SUMMARY OF THE INVENTION

The object of the present invention is to provide a method for optimizing the capacity utilization of the conveyor element in favor of improved non-damaging treatment of the root crop.

According to the mention, the object is achieved by means of a method of the generic type in which an evaluation device generates, on the basis of the test data set, a conveying speed signal, independent of a speed of the harvested material, for setting the conveying speed. The evaluation device is used to calculate the test data set or sets to form the conveying speed signal on which the speed of the harvested material represented by the test image, and in particular of the conveyor element, does not have any influence. The speed of the harvested material is understood to be the direction-independent absolute speed value of the harvested material which is transported by means of a conveyor element. Correspondingly, a (conveying) speed of the conveyor element is understood to be its direction-independent absolute speed value e.g. of the circulation speed of a screening belt, of a screening star or of a roller.

The machine is a vehicle, which is self-propelled or towed during operation, for harvesting root crop, in particular potatoes, beets, carrots or chicory. While the method according to the invention is being carried out, the machine is moved along, in particular in the direction of rows, in particular cultivation ridges of the root crop to be harvested, and these are picked up from the ground as part of the harvested material in a continuous process. After the harvested material has been picked up, at least some of the harvested material is moved along relative to the machine frame of the machine by the at least one conveyor element. The conveyor element preferably serves here also to separate the root crop from extraneous materials and is in particular part of a separating device comprising at least one separating element for separating the root crop arranged on the conveyor element from extraneous materials arranged on the conveyor element.

Alternatively, the machine can also be a machine for separating root crop from extraneous materials of the harvested material, e.g. clods, stones or soil.

In particular, the conveyor element is a circulating or rotating element. The conveyor element is preferably embodied as a screening star, screening belt, hedgehog web, ring elevator or as a conveyor roller, in particular included in a roller table. The conveying speed is in particular a lateral speed of a conveyor element section which makes contact with the harvested material, a circulation speed or a rotational speed. The change in the conveying speed causes the density or filling height of the harvested material, in particular of the root crop, on the conveyor element to vary.

The optical image-capturing unit is in this respect in particular arranged in a positionally fixed fashion on the machine above the conveyor element. The image-capturing unit is directed at the conveyor element, and therefore during operation at a stream of harvested material which is conveyed by the conveyor element. The method according to the invention is carried out with the machine in particular exclusively during the harvesting process, and is preferably repeated cyclically in this context. In particular, transitions between individual conveyor elements, e.g. in the form of drop steps, and conveyor elements which convey inward and outward upstream and downstream of separating elements of separating devices are monitored.

The test image is in particular a multidimensional, preferably two-dimensional, representation in which at least part of the harvested material is represented with root crop, extraneous materials and/or the conveyor element. The test data set is either already generated by the image-capturing unit or by the evaluation device, on the basis of the test image captured by the image-capturing unit. Alternatively, the test data set can be formed by the test image itself. This applies in particular to image-capturing units whose test images are already in a format which is suitable for the subsequent analysis in the evaluation device. The test data set is in particular a data set which is provided at least temporarily in the system by processing, for example filtering and/or other representations, and whose information, e.g. color values, is evaluated in the evaluation device. Said data set can be present e.g. as an image file, table, matrix or vector field. The test image or the test data set is transmitted to the evaluation device by the image-capturing unit. The optical image-capturing unit is embodied in particular as a digital photo camera or video camera for the two-dimensional capturing of the test image or as a line-scan camera. If reference is made below to the test image in conjunction with the processing of the image information in the evaluation device, this may involve the test data set in this context.

The evaluation device serves to evaluate the test data set. The evaluation device comprises at least one processor and is embodied either as a central computing unit or as a decentralized system comprising at least one processor and at least one memory with different positions on components of the machine. The system is therefore a local one for carrying out evaluations directly in situ and making the results directly available.

The conveying speed signal for setting the conveying speed is sent by the evaluation device in particular to a conveying speed control unit of the machine or to the conveyor element itself. The conveying speed signal is preferably a digital data set which is sent in a wired or wireless fashion. This preferably triggers an increase, a reduction or maintenance of the present conveying speed. The conveying speed signal corresponds in particular to a capacity utilization characteristic value which is calculated using the test data set, which characterizes the capacity utilization rates of the conveyor element, and is in particular interpreted by the conveying speed control unit. In particular an electrical signal is output by the conveying speed control unit, which is included, in one advantageous refinement of the invention, in the same computing unit as the evaluation device. The conveying speed control unit adapts, particularly by means of the electrical signal, in particular a hydraulic pressure, a pneumatic pressure, a current, a voltage, a force and/or a torque for driving the conveyor element. In particular, the conveying speed control unit receives not only the conveying speed signal but also further, in particular higher-priority, signals which are used to adapt the conveying speed.

An advantage of a conveying speed signal which is independent of a speed of picked-up objects from the flow of harvested material is that the fault which is entered as a result of the determination of the speed of the harvested material or speed of the conveyor element and which impedes or prevents detection of excessively low or excessively dense occupancy of the conveyor element is avoided. Instead, the conveying speed signal is dependent on other dynamic variables, i.e. variables which relate to the movement of the harvested material or of the conveyor element, or stationary variables, i.e. variables which are independent of a movement of said material or element. When there are a multiplicity of said variables, it has been possible to determine a significant correlation with the capacity utilization of the conveyor element, permitting the capacity utilization rates then to be controlled reliably on the basis of the conveying speed signal. The computer capacity which is necessary to generate the conveying speed signal is also reduced. In particular, in this way the occupancy of the conveyor element, i.e. the density of harvested material on or in the conveyor element, can be controlled largely independently of the velocity and/or of the harvested material picked up by the machine. The root crop to be harvested are therefore conveyed under optimal conveying conditions and at the same time cleaned to an optimum degree and damage is avoided.

The setting of the conveying speed is carried out in particular automatically and independently of the velocity of the self-propelled or towed machine, which causes less distraction for any operating personnel.

The evaluation device preferably compares the test data set with an initial data set which is generated using an initial image or formed thereby. The initial data set which is provided on the basis of the initial image or formed thereby has particularly preferably been captured chronologically before the test image with the same optical image-capturing unit. The initial data set arises from identical processing to the processing of the test data set. In particular, in the comparison of the test image data set and the initial data set, brightness values, contrasts or color values are compared. Comparing the test data set with the initial data set simplifies an evaluation of the dynamic behavior of the harvested material and/or permits trends to be recognized in the composition, as a result of which further information about the operating state of the machine and its development can be obtained. On the basis of this information, a more soundly based conveying speed signal can be provided and a temporarily improved capacity utilization can be achieved. The comparison of brightness values, contrasts or color values can also include a statistical evaluation of these respective values.

The conveying speed signal which is generated on the basis of the test data set and of the initial data set, for setting the conveying speed, is preferably either independent of the speed of the harvested material and/or of the conveyor element or at least only additionally dependent thereon. By additionally taking into account the speed, differing influences on the capacity utilization, which are relevant to specific root crop, can be determined, and therefore an optimized conveying speed signal can be provided for these cases.

In one advantageous refinement of the invention, the test data set from a first execution of the method serves as an initial data set for a further execution of the method. The test data set from a first execution of the method is therefore the same as the initial data set of a further execution of the method. Alternatively, both a test image and an initial image are captured whenever the method is executed. In particular, the optical image-capturing unit captures images with a frequency between 0.1 and 1000 Hz, wherein a comparison of the test data set with the initial data set preferably takes place at a lower frequency, in particular of 0.1 to 10 Hz. As a result of these method features, the conveying speed signal is based on a particularly high-resolution data basis and as it were permits the method to be executed efficiently.

In particular, the method according to the invention is distinguished in that the evaluation device determines the conveying speed signal on the basis of an evaluation of the optical flow of the harvested material which is obtained from the test data set and the initial data set. The optical flow which results from the test data set and the initial data set is a data set with movement information of the object or objects which can be seen in the test image, in particular in the reference system of the imaging optics of the image-capturing unit.

The evaluation device preferably calculates at least one movement characteristic data set, in particular in order to determine the optical flow. The movement characteristic data set characterizes a movement, in particular a direction of movement, of at least one object which is at least partially represented by the test image, in particular by part of the test image. In particular, a plurality of objects can be represented simultaneously in at least one part of the test image, so that the movement characteristic data set at least indirectly indicates the direction of movement thereof. The conveying speed signal is generated on the basis of the movement characteristic data set.

The movement characteristic data set preferably contains just one information item or one numerical value or a multiplicity of information items or numerical values. The movement characteristic data set is calculated in particular on the basis both of the test data set and the initial data set or the comparison thereof, and alternatively only on the basis of the test data set.

The movement characteristic data set contains an indication which at least partially specifies a movement of the at least partially represented object or objects. In particular, the movement characteristic data set has information about the direction. When there are a plurality of objects which are possibly only represented partially, the movement data set can have information about a plurality of directions or an overall direction of movement. The object can be here any at least partial representation of a represented body with a physical extent, in particular at least part of a root crop, of a stalk of a weed, of a clod, of earth, of the conveyor element, or combinations thereof.

The movement information on any possibly present objects or combinations of objects in the test image and in the initial image are determined during the determination of the optical flow by comparing areas which can be found again at least in parts in both images. These areas which can be found again can be, for example, of the size of a pixel or be characterized by a pixel, so that no object detection in the sense of the detection of objects in the form of root crop, stones or the like is necessary.

Taking into account the movement characteristic data set which characterizes the movement of a represented object makes it possible to calculate a more detailed conclusion about a movement situation of the represented harvested material. In particular, a movement situation already results solely from considering the direction of the movement, preferably while dispensing with consideration of the speed.

In particular, the conveying speed signal and a change in the conveying speed triggered thereby make it possible to influence the movement situation continuously and in a way which is particularly insusceptible to faults, thereby permitting an optimum throughput rate of harvested material.

The movement characteristic data set preferably contains two numerical values, on the basis of which a vector can be generated. The movement characteristic data set preferably comprises two distances in different directions or alternatively an angle and a distance. As a result, it is possible to generate at least one vector which is preferably represented for a user by means of the test image on a visualization unit. The user as a result receives an image of the movement situation and can if desired check the success of the change in the conveying speed which is brought about by the evaluation device.

In order to calculate the at least one movement characteristic data set, a test data subset, which is generated using a first partial image area of the test image, is preferably compared with a plurality of initial data subsets which are generated using further partial image areas of the initial image. Alternatively, an initial data subset, which is generated using a first partial image area of the initial image, is compared with a plurality of test data subsets which are generated using further partial image areas of the test image. At each comparison, correspondence of the respective test data subsets and initial data subsets is assessed. At each comparison, in particular precisely one test data subset is compared with precisely one initial data subset. Correspondence between a test data subset and an initial data subset is particularly good in particular when there is a high degree of visual similarity between the partial image areas described by said data subsets. In order to determine the similarity, brightnesses, contrasts and/or color values can be compared.

The correspondence is assessed in particular only on the basis of the respective test data sets and initial data sets, and alternatively on the basis of further data from the test data sets and initial data sets. In another preferred refinement, the correspondence is also assessed on the basis of further information which is not part of the test data sets and initial data sets and which is obtained in particular by means of sensors of the machine. In particular, an auxiliary variable such as for example a circulation speed of the conveyor element is taken into account for the assessment of the correspondence. As a result, for example an expected positional deviation between two partial image areas is preferably determined in advance from the test data set and the initial data set and is input into the assessment of the correspondence.

The correspondence is preferably assessed on the basis of a contrast between the components of the test data subsets and initial data subsets which form the basis of the partial image areas. In particular, a detected contrast of the first image area is compared with at least partially corresponding contrasts of the further partial image areas, and the correspondence between the contrasts is assessed in particular on the basis of a brightness gradient or color gradient or a spatial extent of the contrast. By means of this form of assessment of the correspondence between different partial image areas it is possible to assign to one another in a particularly reliable way partial image areas which show at least to a certain extent the same object, which therefore permits a movement of the harvested material to be tracked, irrespective of whether entire parts of the harvested material, such as e.g. potatoes, stones or the like, are represented. As a result, the conveying speed signal can be calculated on the basis of a relatively large quantity of information and as a result the speed of the harvesting machine can be controlled particularly precisely as a function of the movement situation.

The movement characteristic data set of an object which is shown by the first partial image area, in particular a direction of movement included therein, is particularly preferably calculated on the basis of position characteristic values of the test data set and the initial data set which are assigned to the two test data subsets and initial data subsets which have the best correspondence. Both the test data set and the initial data set therefore contain position characteristic values which represent the position of different image areas of the test image or of the initial image relative to other image areas or image reference markings or in an absolute fashion. The direction of movement is calculated individually in particular on the basis of a calculation of two position characteristic values which differ from one another, for which purpose the position characteristic values contain in particular position data of at least two different dimensions. The direction of movement therefore indicates from where to where an image area or object which is represented by the test image or by the initial image has moved between the capturing of the initial image and the capturing of the test image, and is defined in particular by two movement distances in different reference directions. As a result, particularly precise information about the movement situation at the conveyor element can be obtained and in particular a blockage or unimpeded onward movement of the harvested material can be detected.

In particular, the evaluation device divides both the test image and the initial image into a multiplicity of image areas of preferably equal size, wherein each image area of the test image or of the initial image is assigned an image area of the initial image or test image which has the best correspondence therewith. Each image area is based in particular on a test data subset or initial data subset. As a result, a multiplicity of movement characteristic data sets, in particular of directions of movement, can be obtained and the movement situation can be determined with higher resolution.

In one advantageous refinement of the invention, a correspondence characteristic value which characterizes the degree of correspondence of a test data subset and an initial data subset influences the conveying speed signal. Depending on how large the degree of correspondence is between the test data subsets and initial data subsets which have the best correspondence, the direction of movement calculated on the basis thereof is assigned in particular a different significance in the calculation of the conveying speed signal. Therefore, a movement of an object which is to be tracked unambiguously has a greater influence on the conveying speed signal than a movement which supposedly could be tracked only on the basis of two test data subsets and initial data subsets which are different from one another. This increases the informative power of the movement characteristic data sets overall and therefore the value of the conveying speed signal.

The evaluation device preferably generates in each case a movement characteristic data set for different objects which are represented at least partially with the test image or different, first image areas which comprise in particular precisely one pixel of the test image and/or of the initial image. In particular, in each case a movement characteristic data set is acquired for a multiplicity of test data subsets and/or initial data subsets, independently of objects shown by the respective images. Particularly preferably, in each case a movement characteristic data set is generated in particular comprising a direction of movement for a plurality of pixels of the test image and/or of the initial image. In particular, a movement characteristic data set is generated for each pixel of the test image and/or of the initial image or alternatively preferably at least for each pixel of a selected, coherent section of the test image and/or of the initial image. By virtue of this number of movement characteristic data sets and the resolution during their acquisition, it is possible to track the movement situation at the conveyor element particularly precisely and to correspondingly set the conveying speed in a manner which is particularly tightly tailored to the movement situation. As a result, the efficiency of the machine is increased further.

The evaluation device preferably calculates, in a first calculation step for a plurality of image areas comprising at least a first number of pixels, in each case a movement characteristic data set, and calculates in a later calculation step, taking into account the movement characteristic data sets calculated in the first calculation step, in each case a further movement characteristic data set for a relatively high number of different image areas, which comprise a relatively low number of pixels. In particular, the evaluation device calculates, in the first calculation step, in each case a movement characteristic data set for a relatively low number of relatively large image areas, and in the later calculation step it calculates a relatively large number of movement characteristic data sets for relatively small image areas, which together produce the same overall image as the relatively large image areas. In this way, the movement characteristic data sets which are calculated in the last calculation step and which are each assigned in particular to one pixel are acquired by means of iterative approximation, and therefore the probability of incorrect movement characteristic data sets which contain in particular directions of movement which do not correspond to the real directions of movement of the objects on the conveyor element is minimized.

The at least one movement characteristic data set preferably comprises at least for a certain time a first movement distance in a first direction and a second movement distance in a second direction, which differs from the first in particular by 90° in the plane of the image, and/or a direction indication and/or an overall movement distance which is independent of the direction. In particular, the direction indication and therefore the direction of movement of the movement characteristic data set are calculated on the basis of the first and second movement distances. The movement distances and/or the overall movement distance are/is specified here in particular as relative values which are dependent on the positioning, in particular on the orientation, of the image-capturing unit and do not require any separate calibration.

In one advantageous refinement of the invention, the evaluation device calculates a capacity utilization characteristic value on the basis of at least one movement characteristic value, characterizing a direction of movement, of the at least one movement characteristic data set and in particular on the basis of at least one reference characteristic value which is assigned to the movement characteristic value. In particular, exclusively movement characteristic values which characterize a direction of movement are used for the calculation of the movement characteristic data sets, and in particular further data which is based on the test data set and/or the initial data set is not used. The movement characteristic value in particular exclusively characterizes the direction of movement. In particular, the capacity utilization characteristic value is calculated on the basis of its multiplicity of movement characteristic values, wherein each movement characteristic value is part of another movement characteristic data set. The movement characteristic value indicates in particular the degree of movement in a transverse direction which differs from the conveying direction of the conveyor element or indicates a direction of movement, for example an angle indication. The movement characteristic values are calculated either as such with respect to the capacity utilization characteristic value or firstly each combined with the assigned reference characteristic value. The reference characteristic value indicates in particular an ideal or global direction in which the harvested material has to move. Deviations of the movement characteristic values from the reference characteristic value or the reference characteristic values are therefore preferably used to calculate the capacity utilization characteristic value.

The reference characteristic values are preferably either all the same and characterize the same direction in which the harvested material has to move onward overall and/or have different values which allocate each image area or test data subset or initial data subset a separate direction of movement for comparison.

In the case of a uniform reference characteristic value for a plurality of movement characteristic values, in particular a basic deviation between the reference characteristic value and at least one large part of the movement characteristic values occurs when there is an absence of computational correction of a perspective-induced distortion of the test image owing to a lens of the image-capturing unit, even if no harvested material, e.g. in the form of beets or potatoes, is represented or said material does not have any movement component in a transverse direction which differs from the reference direction.

The evaluation device particularly preferably statistically evaluates a plurality of movement characteristic values, which are included in different movement characteristic data sets, in order to calculate the capacity utilization characteristic value. This preferably involves the movement characteristic values of the pixels of at least one part of the test image. In particular, the evaluation device calculates a standard deviation of the movement characteristic values, which characterize in particular a direction of movement, from the respective reference characteristic values or from the uniform reference characteristic value. For this purpose, in particular the absolute values of the deviation of the movement characteristic value from the reference characteristic value are used insofar as an average absolute-value deviation is initially calculated. The statistical evaluation of the movement characteristic values and therefore the determination of the capacity utilization characteristic value are preferably carried out independently of the absolute value of the speed of the harvested material which is represented by the test image.

In one preferred exemplary embodiment of the invention, the differences between the deviations from the average deviation are then formed and subsequently squared. The squared differences are summed and divided by the number of movement characteristic values, and the square root is subtracted from the result thereof. By virtue of this form of statistical evaluation, the capacity utilization characteristic value correlates particularly well with the risk of the occurrence of a blockage in the region of the conveyor element, as a result of which the conveying speed signal can be used particularly reliably to set an actual capacity utilization which is close to a maximum possible capacity utilization.

As an alternative to the calculation of the standard deviation, the capacity utilization characteristic value is calculated as a mean value of the movement characteristic values, which indicate the direction of movement, or the absolute values thereof or the absolute-value deviation thereof from the reference characteristic value or values. As another alternative, the mean value of movement characteristic values which indicate an overall movement distance or a mean squared error of these movement characteristic values is calculated. In these cases, the capacity utilization characteristic value also has a significant correlation with the actual tendency of the machine to become blocked.

According to the invention, a statistical evaluation of only the directions of movement of the objects which are at least partially represented in the test images, in particular using the standard deviation of the direction of movement with respect to a reference direction, specified by the main conveying direction or directions of the associated conveyor element, is generally particularly well-suited to determining the conveying speed signal.

As an alternative to or else in addition to the calculation of the standard deviation, the capacity utilization characteristic value is calculated as a mean value of the movement characteristic values, which indicate the direction of movement, or the absolute values thereof or the absolute-value deviation thereof from the reference characteristic value or values. As another alternative, the mean value of movement characteristic values which indicate an overall movement distance or a mean squared error of these movement characteristic values is calculated. In these cases, the capacity utilization characteristic value also has a significant correlation with the actual tendency of the machine to become blocked. Percentiles over flow lengths or flow orientations, statistical, absolute or central moments of the 1st, 2nd, . . . k-th order, or in particular histogram comparisons of the current histograms with normal histograms which can be configured in advance can be used as further statistical features which can describe the flow behavior and can therefore serve individually or together with other values as input variables for speed control.

As an alternative to or in addition to the refinements of the method according to the invention as described above, the evaluation device calculates at least one first portion of the test image which is formed by at least one image area. The at least one image area forms at least to a certain extent a defined component of the harvested material or of the machine. In particular a capacity utilization characteristic value or a further capacity utilization characteristic value is calculated on the basis of the first portion. In many exemplary embodiments, the capacity utilization characteristic value can be equated with the portion.

Before the first portion is calculated, the component which is represented statistically by the first portion is predefined. The test image and/or the test data set are subdivided in particular into a multiplicity of image areas of preferably equal size. The image areas, which at least partially show the component, together form the first portion. The portion is in particular a portion of those image areas of the entire image areas which at least partially show the component, wherein the first portion is formed using a ratio of numbers of image areas or using their common areas.

The first portion is a measure of the extent of image areas which represent the component and therefore a measure of the density of the component in the field of vision of the image-capturing unit or of that portion of the test image which is being considered. The component is in particular at least partially a component of a root crop, as a result of which the first portion at least approximately indicates a concentration of root crop. An image area is assessed as representing the component, and classified as being associated with the first portion, in particular when at least 50% to 100% of its area shows the component. In particular, the at least one image area can also be classified as being associated only proportionally with the first portion or preferably respectively classified as being partially associated with different portions. This is advantageous in particular if it is not possible to make an unambiguous assignment of the image area to a corresponding component within the scope of the preferably model-based classification method. In this case, probabilities for the assignment to different portions are preferably determined. The image areas are particularly preferably classified as being proportionally or partially associated with different portions in accordance with the probabilities. As a result, the ratios of the components to one another are represented even more precisely.

The characteristic value which characterizes in particular the composition of the harvested material is calculated by calculating the first portion. On this basis, the conveying speed can be controlled particularly advantageously, since the cleaning performance of the conveyor element or of the separating device comprising the conveyor element is highly dependent on the composition of the harvested material. In the event of the first portion characterizing a concentration of extraneous materials, the conveying speed can preferably be increased with a rising first portion, in order to generate lower occupancy in favor of a greater separating effect, in particular screening effect. The capacity utilization characteristic value is preferably calculated at least on the basis of the first portion or is equal to the first portion.

The conveying speed signal is preferably dependent on a speed of the harvested material or of the conveyor element. In particular the capacity utilization characteristic value can be calculated by means of a speed value which represents this speed, which characteristic value therefore has different informative power.

The at least one image area which forms the first portion is preferably identified, in particular on the basis of a test data subset generated using the image area, as showing the defined component. In particular, the image area is identified on the basis of a test value, which is contained in the test image and/or in the test data subset, preferably color information. The color information comprises in particular black-and-white values, gray values and/or color channel values of a color space.

The test data subset, the test value and the color information are preferably classified by an, in particular model-based, statistical classification method. An image area is accordingly classified as being associated with the first portion in particular when the result of the classification method is assigned to the defined component of the harvested material or the machine. The classification method uses in particular a neural network, a random forest, a Bayesian classifier, a support vector machine and/or a decision tree. Applying the classification method makes the result of the calculation of the first portion, in particular of different portions, particularly robust and informative in respect of the composition of the harvested material.

The test value or the color information is particularly preferably compared with one or more reference values or reference ranges and on this basis an image area is classified as being associated with the first portion or not. The reference image is preferably to be captured, like the test image, by means of the optical image-capturing unit, wherein a user has to mark in particular different parts of the reference image as showing different components. This form of differentiation permits particularly reliable identification of a relevant component in the test image. At least one of the test values of the test data subset, which comprises in particular the color information, is particularly preferably compared with at least one reference value, and an image area is classified as being associated with the first portion in particular when at least the at least one test value of the test data subset lies within an assigned reference value range. This reference value range is limited in particular by a maximum value and by a minimum value, wherein in order to classify the image area as being associated with the first portion different test values must preferably lie in respectively assigned reference value ranges.

In one advantageous refinement of the invention, when exemplary image areas, which can be classified as being associated with the first portion, of the reference image are input, the evaluation device automatically develops, or automatically further develops, a model on which the classification method is based. Alternatively or additionally, the evaluation device automatically calculates or changes the at least one reference value range when exemplary image areas, which can be classified as being associated with the first portion, of a reference image are input. In particular, the reference values, the reference value ranges and the model or model parameters thereof therefore at least do not have to be completely manually predefined by the user. Instead, to activate the evaluation device it is sufficient to input at least one exemplary image area which shows the component. By using the image area, the evaluation device determines the at least one reference value, the at least one reference value range and the model or model parameters thereof automatically. The evaluation device therefore sets itself largely automatically to different application cases. The higher the number of image areas which are input here, the more precisely can the reference values, the reference value ranges and the model or model parameters thereof be determined.

The method is particularly robust when the image areas which are input show the component under different brightness conditions and/or soil conditions. The method can therefore also be used reliably under different application conditions. The evaluation device particularly preferably adapts the at least one reference value or the reference value ranges during the repeated execution of the method, if appropriate with exemplary identification of relevant components by the operator, on the basis of which training data for the algorithm can be represented.

In particular, using further sensors such as brightness sensors for measuring the ambient brightness which the evaluation device assigns essentially simultaneously to captured test data sets, the evaluation device automatically expands the scope of the reference data. Alternatively or additionally, the user of the method, i.e. in particular the driver or operator of the machine or of a machine coupled thereto, has the possibility of manually marking the at least one component on visualized test images, in order to expand the scope of the reference data of the evaluation device. Therefore, on the basis of the details once specified by the user or on the basis of data stored in the evaluation device, said device can differentiate e.g. potatoes, weeds, stones and clods and calculate respective portions.

The method according to the invention is, with the exception of the inputting of any training data in the form of the marking of components, preferably executed automatically after its start. This facilitates control of the machine for the driver or operator thereof.

The image areas which form the first portion are preferably identified on the basis of image data subsets which are generated using respectively adjacent image areas or formed by means thereof. In particular, color information, preferably also comprising black-and-white and/or gray values, in turn included in the test data subsets, are used for this. The assessments of the image areas are therefore not carried out solely using the data assigned thereto, rather will additionally use further data which is assigned to the surrounding image areas. As a result, brightness profiles and/or color profiles can be determined, and the identification can therefore be carried out on a wider data basis.

The different image areas are preferably weighted differently during the calculation of the first portion. The contribution of the image areas which form the first portion is therefore different. This makes it possible for the first portion not to be calculated solely using the perspective representations of the test image but rather in particular to give a higher weighting to image areas which show a component of the harvested material which is further away from the image-capturing unit than image areas which show a component which is closer to the image-capturing unit. As a result, a first portion from which perspectives are removed can be formed, and therefore an image of the composition of the harvested material on the conveyor element which is particularly close to reality can be obtained.

The entire test image or a coherent test image part is preferably divided into partial image areas which are, for example, already described in advance. The partial image areas in particular each comprise the same number of pixels of the test image, preferably precisely one pixel. The test image part is a part or excerpt of the test image which comprises a multiplicity of partial image areas. For the calculation of the first portion, in particular only the image areas which show the portion and are associated with the test image part are taken into account. For this purpose, the test image part is in particular defined in such a way that it represents sensitive zones, which are to be monitored, within the machine. The image area which forms the first portion therefore comprises in particular a plurality of partial image areas of a test image part.

The test image or the test image part is in particular divided into a grid of a multiplicity of partial image areas, which are each preferably rectangular. When the partial image areas are formed by precisely one pixel, a particularly large database is provided for the assessment of the state of the harvested material with respect to its individual components, and particularly sensitive control of the operating parameter is therefore made possible. At the same time, the data quantities which are supplied by conventional 2D digital cameras with generally a maximum of several million pixels can readily be processed in close-to-real-time conditions by an evaluation device which is equipped with one or more current processors.

The test image preferably comprises a plurality of test image parts for which the evaluation device respectively calculates a first portion, in particular a plurality of portions of image areas. The test image parts show in particular different sections of the same conveyor element or different conveyor elements. In particular, the test image parts show sections of a conveyor element, one of which is arranged upstream of a separating device or of a separating element thereof in the conveying direction, and a further one of which is arranged downstream of the separating device or of a separating element thereof. Alternatively, the test image parts show different conveyor elements which represent alternative conveying paths for different components of the harvested material (for example one conveyor element for cleaned root crop, one conveyor element for extracted extraneous materials). The cleaning performance or separating performance of the associated separating device can be assessed particularly comprehensively by calculating the first portion for these different test image parts. In particular, the first portion of a stream of harvested material flowing to the separating device can be compared with the first portion of a stream of a mixture of root crop flowing away from the separating element or the separating device, and in this way the effectiveness of the separating device can be determined. In particular the conveying speed is set as a function of the effectiveness, so that, for example, blockages which occur for a brief time are overcome through relatively slow conveying toward the blockage or relatively fast conveying away from the blockage. Accumulation of harvested material can be estimated particularly well through the definition of different test image parts upstream of a separating or deflection device. It is therefore possible to relate occupancy with harvested material, for example for a test image part located directly upstream of the deflection device, to occupancy ahead of this area, in order e.g. to increase the conveying speed if the occupancy upstream of the deflection device is too low.

Likewise, the test image parts which are represented or present in respective test data sets can show part of a conveyor element upstream of a separating element or deflection element of the separating device and part of the conveyor element downstream of the separating element or deflection element. Insofar as the image analysis reveals that excessively large portions of e.g. root crop appear in an undesired area downstream of a deflection element, which can be an indication of a lack of separation owing to a blockage, the conveying speed can be correspondingly adapted.

In a further embodiment of the invention, the test image parts preferably show different conveyor elements downstream of a separating device, in particular one conveyor element for carrying away a mixture of root crop and one conveyor element for carrying away extraneous materials downstream of the same separating device. In this case, a first portion of a component, for example of root crop, is preferably determined for both test image parts. Alternatively, different portions are calculated for the different test image parts. In this way, for example one portion of extraneous materials in the stream of a mixture of root crop flowing away can be compared with a portion of root crop in a stream of extracted extraneous materials, and on the basis thereof a conveyor element which is assigned to the separating device can be set with respect to its speed.

The image areas which form the first portion preferably show root crop or parts thereof and image areas which form a second portion show extraneous materials or parts thereof. Therefore, the evaluation device calculates at least two different portions. The evaluation device particularly preferably calculates at least four portions, comprising one portion for machine components, one portion for root crop, one portion for weed components, one portion for earth or clods, one portion for stones and/or one portion for damaged locations. Depending on the application, in particular just a subset of the specified portions is calculated and/or a plurality of the specified portions are combined. The sum of the portions is in particular <1.

A multiplicity of portions in the calculation of the evaluation device make it possible to obtain a more precise picture of the composition of the harvested material and/or the occupancy of the conveyor element. As an alternative to identifying image areas using limiting values, all the image areas of the test image or of a test image part are necessarily assigned to a portion. In this context, preferably a degree of correspondence between test data subsets calculated using the image areas and reference data subsets is assessed, and each image area is assigned to the portion for which the correspondence is greatest.

In one advantageous refinement of the invention, the capacity utilization characteristic value is based on a deviation, calculated by the evaluation device, of the first portion from a threshold value. In particular, the threshold value characterizes an optimum capacity utilization of the conveyor element, wherein a deviation from a defined absolute value thereof triggers an increase or a reduction in the conveying speed. The capacity utilization characteristic value is based in particular on a multiplicity of portions and preferably further data, in particular sensor data.

In one advantageous refinement of the invention, the conveying speed signal is calculated using a multiplicity of capacity utilization characteristic values which are in particular calculated in chronological succession, or at least one previously calculated capacity utilization characteristic value is input into the calculation of the capacity utilization characteristic value. In particular, a sliding mean value of the capacity utilization characteristic value is calculated and is used as the basis for the conveying speed signal, or smoothing of the capacity utilization characteristic value profile is carried out, in particular using a low-pass filter. By virtue of these measures, the method according to the invention becomes particularly insusceptible to faults and can therefore be used in a particularly robust way.

In one advantageous refinement of the invention, at least one sensor transmits sensor data to the evaluation device, which data is input into the calculation of the conveying speed signal. The sensor is in particular a sensor, preferably a tactile sensor or an ultrasonic sensor, for measuring a layer thickness of harvested material on the conveyor element and/or a rotational speed sensor in particular for measuring a rotational speed of a conveyor element drive. The sensor is preferably a sensor for measuring the drive power level, for example in the form of a pressure sensor for measuring a hydraulic oil pressure. In particular, slip of the conveyor element is determined using the rotational speed sensor and transmitted in the form of the sensor data to the evaluation device. Information can also be input into the calculation of the conveying speed signal by means of a moisture sensor.

On the basis of this further information which is present in the sensor data and goes beyond that which is made available on the basis of the test image, the evaluation device is provided with a significantly more precise picture of the capacity utilization situation in the vicinity of the conveyor element, as a result of which the conveying speed can in turn be influenced in a way which is matched better thereto.

The evaluation device preferably triggers either an acceleration or a deceleration of the conveying speed at least of individual conveyor elements of the harvesting machine by means of different conveying speed signals. In particular, the evaluation device or the conveying speed control unit comprises a three-point controller, as a result of which the acceleration, the deceleration or maintenance of the current conveying speed is triggered as alternatives to one another. An acceleration is triggered in particular when the capacity utilization characteristic value exceeds a predefined first threshold value, and a deceleration is correspondingly triggered if the capacity utilization characteristic value undershoots a predefined second threshold value. The current absolute value can advantageously be taken into account again in the calculation of the actual increase or decrease in the conveying speed, on the basis of the conveying speed signal.

A conveying speed gradient which is triggered by the conveying speed signal and/or the difference between the conveying speeds upstream and downstream of an acceleration or deceleration is particularly preferably dependent on the capacity utilization characteristic value. In particular, the absolute value of the speed gradient in the case of deceleration is higher than in the case of acceleration, in order to avoid blockages as reliably as possible and at the same time avoid the harvested material being subject to shocks on the conveyor element. In addition, a speed increment which is larger the smaller the capacity utilization characteristic value and/or smaller the larger the capacity utilization characteristic value is to be preferred. Alternatively, each capacity utilization characteristic value is assigned precisely one conveying speed which is continuously adjusted in accordance with the capacity utilization characteristic value.

After the triggering of a change in the conveying speed no further change in the conveying speed is preferably triggered for a defined time period and/or a defined conveying distance. As a result, after a change in the conveying speed, in particular an acceleration or deceleration, triggered by the conveying speed signal, no further change occurs until an effect of the triggered change in the conveying speed can be assessed. At the same time operations are carried out in a way which is less damaging to materials. In order to determine the time period between the change in the conveying speed and the time at which the harvested material which is located upstream of the conveyor element when there is a change in the conveying speed reaches the test image, the evaluation device receives in particular a signal of a speed sensor or rotational speed sensor which is used to monitor the circulation speed of the conveyor element. The signal or the circulation speed can be used to calculate how long the time period is theoretical. This refinement of the method avoids over-regulation of the conveying speed and takes into account the inertia of the change in the movement situation of the harvested material, and therefore in the capacity utilization characteristic value, which necessarily occurs.

The conveying speed signal is preferably transmitted in a wired fashion, in particular by means of a CAN bus or ethernet, or in a wireless fashion, to the conveying speed control unit, wherein the setting of the conveyor element is preferably to be enabled in advance by an operator by means of an input at an interface. This form of data transmission makes it possible to integrate the conveying speed signal into existing data infrastructures particularly easily and therefore easily change the conveying speed on the basis of the conveying speed signal. The reliability of the method is increased here in particular by virtue of the fact that, instead of an automatic setting, an operator is provided, in particular in the driver's cab, with a display of the setting of the conveyor element which results or is to be performed, and the operator has to enable said setting on an interface (e.g. in the form of a human-interface device) by means of a corresponding input.

The object is also achieved by a machine for harvesting root crop. The machine comprises a machine frame, at least one conveyor element, at least one optical image-capturing unit and one evaluation device and is designed to carry out the method described above. The image-capturing unit is in particular a 2D or 3D camera, preferably a camera or video camera for capturing color images or black-and-white images. The image-capturing unit is preferably assigned at least one light source which during operation illuminates the objects which are represented by the test image. As a result, the movement characteristic data sets can be simplified, in particular, on the basis of contrasts which can be detected, and said data sets can be calculated more reliably.

The evaluation device preferably comprises a graphic processor unit, in particular a GPU (Graphical Processing Unit) or GPGPU (General Purpose Graphical Processing Unit) and/or an FPGA (Field Programmable Gate Array)-based processor unit. This embodiment of the evaluation device makes it possible to evaluate the test data set in a way which is particularly economical in terms of resources.

In one advantageous refinement of the invention, the machine has at least one sensor which is coupled to the evaluation device, in particular a tactile sensor or ultrasonic sensor for measuring a layer thickness of harvested material on the conveyor element, a sensor for measuring a drive power level, for example a pressure sensor for measuring a hydraulic oil pressure, a moisture sensor and/or a rotational speed sensor arranged on a conveyor element. By means of this sensor it is also possible to calculate both the conveying speed signal and the movement characteristic data sets on the basis of measured physical variables, which significantly increases the informative power of the variables calculated with the evaluation device and reduces the susceptibility to faults of said device.

The machine preferably has a plurality of image-capturing units which during operation each capture at least one test image of the same conveyor element. Alternatively, the machine preferably has a plurality of image-capturing units which during operation each capture at least one test image of different conveyor elements. The composition of the harvested material, in particular a profile of the first portion, can be tracked along a conveying line of the machine by means of the multiplicity of image-capturing units. In particular, the conveying speeds of different conveyor elements can therefore be set on the basis of different first portions.

The conveyor element is preferably embodied as a screening belt or hedgehog web. The harvested material lies at least for a certain time thereon during operation. During operation, the conveyor element runs here in particular under at least one deflection roller which extends transversely across the conveyor element and deflects harvested material therefrom. During operation the deflection roller rotates in particular about a rotational axis which, in a plan view of the conveyor element, is set at an angle of less than 90° with respect to the conveying direction of the conveyor element. In this case the conveyor element and deflection roller together form a separating device which can be monitored using the method according to the invention. Alternatively, the conveyor element is embodied as a screening star or conveyor roller, wherein the conveying speed is a rotational speed of said star or roller. In this context, the screening star conveys the harvested material in particular by virtue of the fact that said material circulates through at least 135°, in particular at least 180°, with the screening star while lying on said star, with the latter's rotational axis extending essentially vertically. In one embodiment of the conveyor element as a conveyor roller, the latter is included in particular in a roller table, wherein a rotational axis of the conveyor roller is arranged in particular essentially horizontally.

The image-capturing unit is preferably arranged in such a way that the test image shows at least two alternative conveying paths for different components of harvested material. As a result, two conveyor elements can be monitored using one image-capturing unit, wherein in each case one test image part of the test image represents a section of the different conveyor elements or of harvested material thereon. In particular, one of the conveyor elements is designed to convey extracted extraneous materials and a further conveyor element of the conveyor elements is designed to convey cleaned root crop. As a result, a particularly comprehensive picture of the cleaning performance and therefore of the capacity utilization of the conveyor element and/or of the separating device which includes the conveyor element can be acquired.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 20 shows a view of a detail of a further device according to the invention.

DETAILED DESCRIPTION OF THE DRAWINGS

Identically or similarly acting parts are, where expedient, provided with identical reference symbols. Individual technical features of the exemplary embodiments described below can also be combined with the features of the exemplary embodiments described above to form developments according to the invention, but always at least in combination with the features in one of the independent claims. The subject matters specified in the list of the figures are in some cases only illustrated partially in individual figures.

Figure 6:
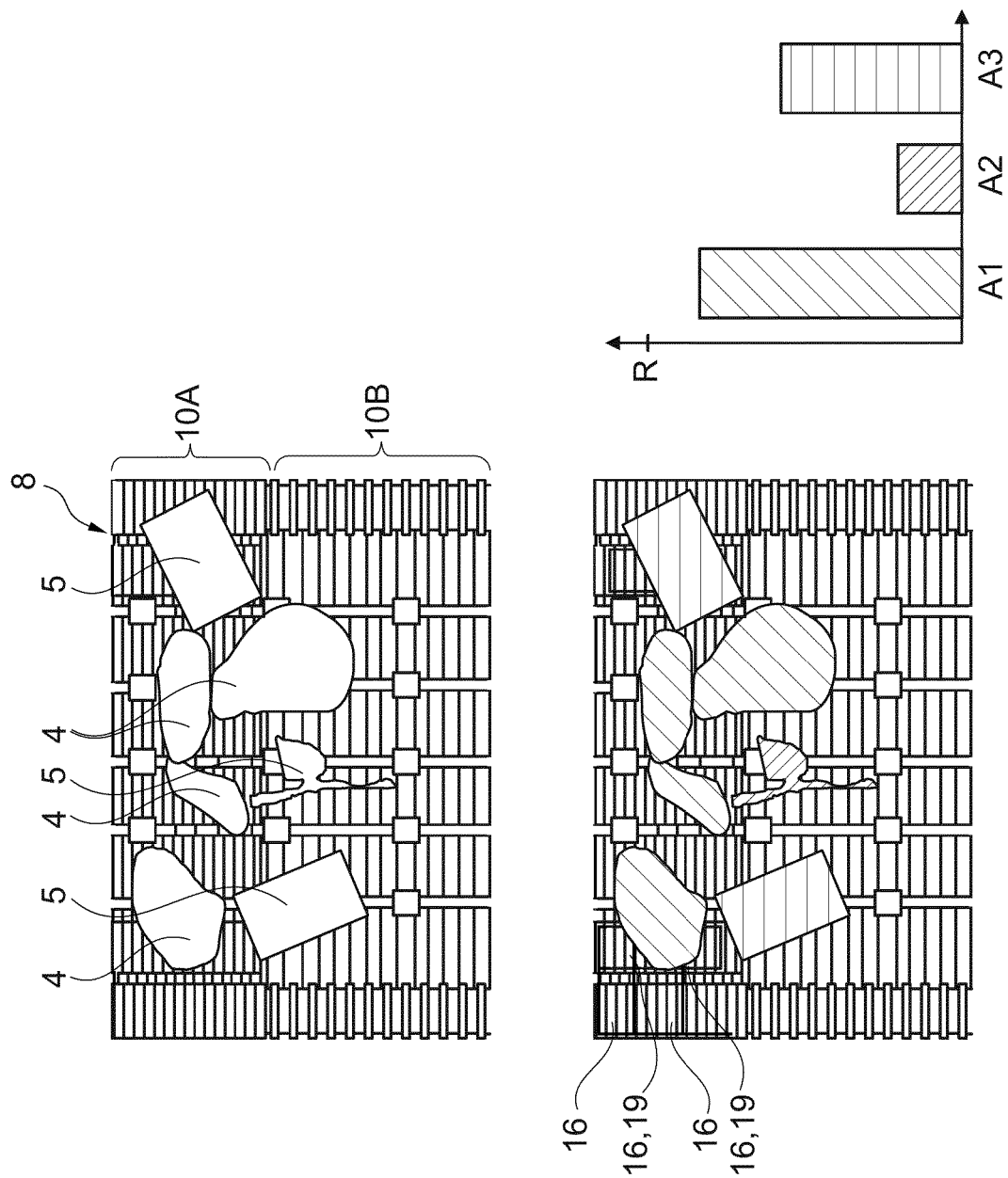
FIG. 6 shows the test image according to FIG. 5 and its further possible partial evaluation.
Figure 7:
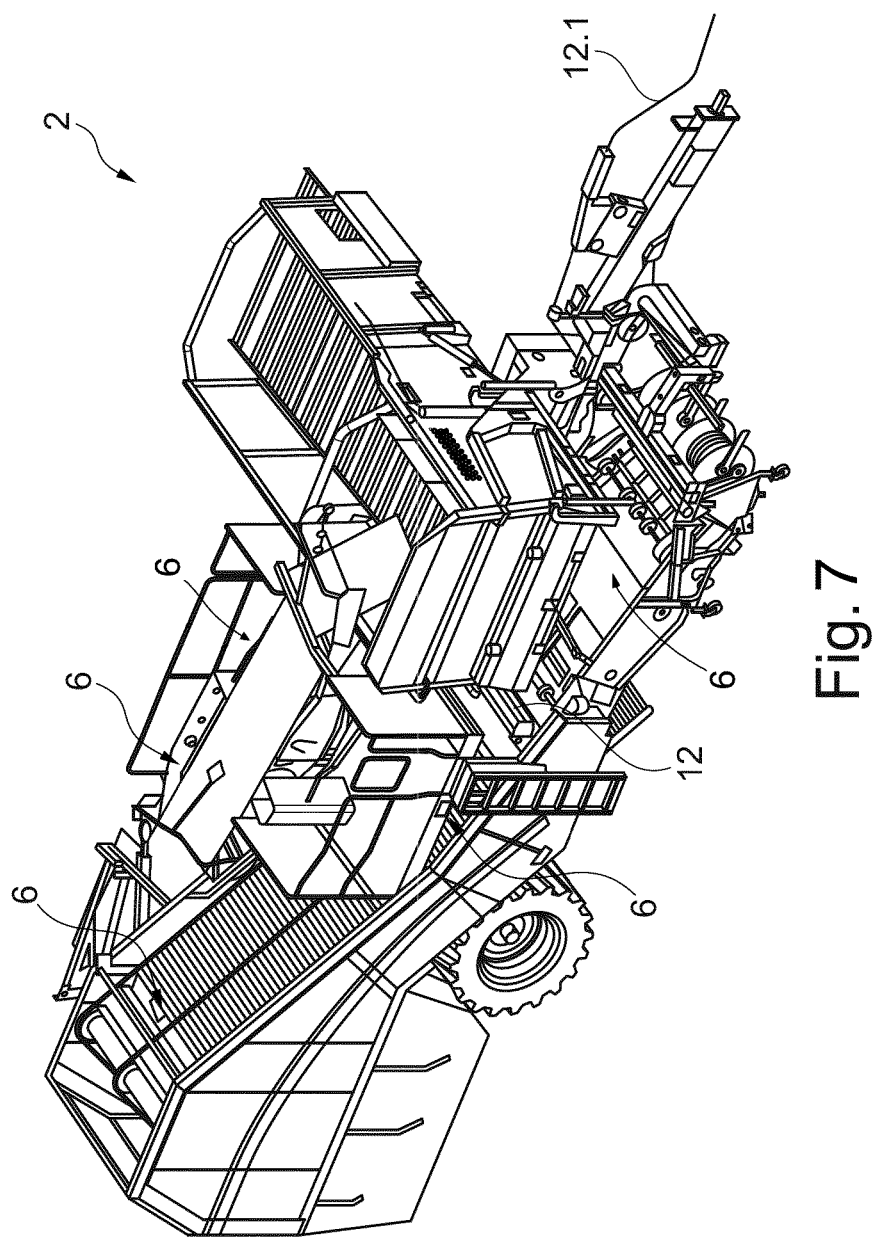
FIG. 7 shows a subject matter according to the invention.
Figure 8:
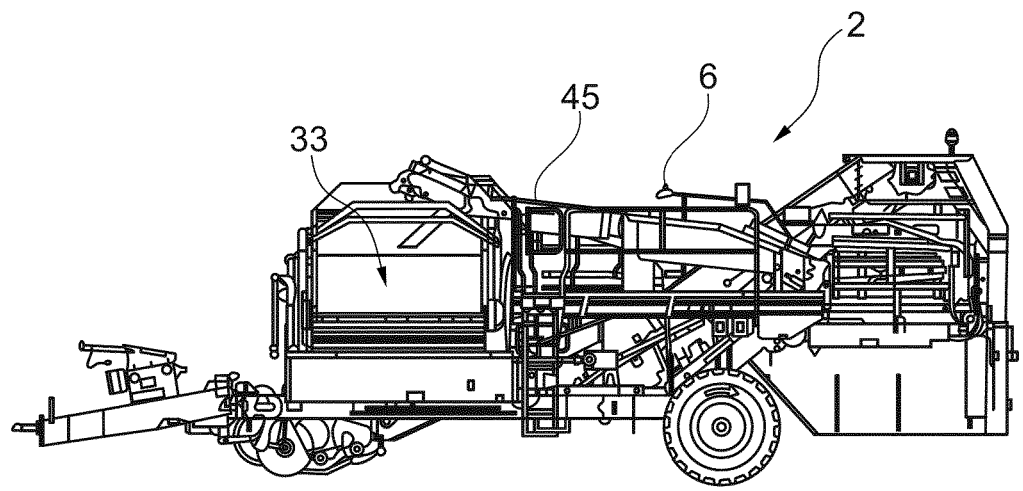
FIGS. 8 and 9 show the subject matter according to FIG. 7 in different side views.

The method according to the invention serves to control the operation of a machine 2 for harvesting root crop 4 (cf. FIGS. 6 to 8). In the method, at least one optical image-capturing unit 6 captures at least one test image 8 which shows harvested material comprising root crop 4 which is moved along relative to a machine frame 12 of the machine 2 by means of at least one conveyor element which is designated initially generally by 10.

The test image 8 is transmitted to an evaluation device which generates, on the basis of a test data set which is generated on the basis of the test image 8 or formed thereby, a separating device setting signal for setting at least one operating parameter of a separating device of the machine 2. The representations which are illustrated as test images or initial images merely show schematically the parts which are relevant for the invention without any borders or limitations. Images, in particular digital images, which are captured by a camera, comprise, under certain circumstances, further information which is not illustrated in the representations. This information can, for example, already be masked or filtered at the camera or when a test data set is produced or processed.

Figure 1:
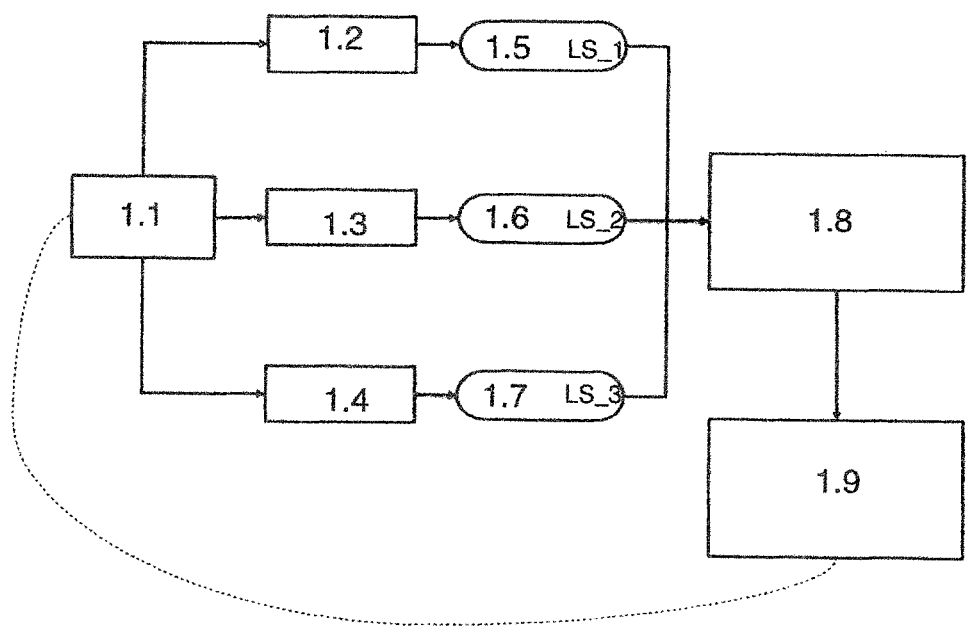
FIG. 1 shows a program sequence diagram of a method according to the invention.

In one exemplary embodiment according to the invention, a crop flow 1.1 of a separating device is captured by means of a first image-capturing unit 6 (block 1.2, FIG. 1). Moreover, the crop flow of two further optical image-capturing units is additionally monitored (blocks 1.3 and 1.4), for example downstream of the outlet of the separating device and in the region of a discharge belt for extraneous materials 5, which are separated off by means of the separating device. Capacity utilization characteristic values LS_1 to LS_3 are determined (blocks 1.5, 1.6, 1.7) for the respective measuring points or areas captured by the image-capturing units 6 by means of the method according to the invention. These values are combined arithmetically in block 1.8, which gives rise to a conveying speed signal for at least one conveyor element 10 of the separating device. In this way, the conveying speed of the conveyor element is set (block 1.9), which optimizes the crop flow 1.1 in the separating device.

Figure 2:
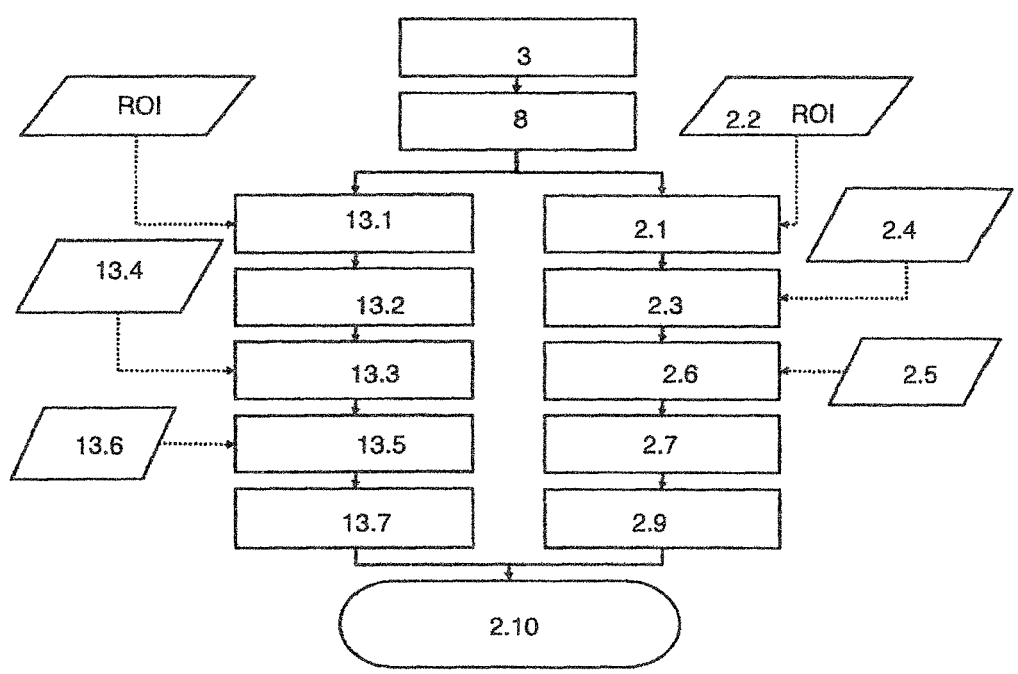
FIG. 2 shows a view of a detail relating to the determination of components of harvested material at a monitored conveying line area.

The determination of the conveying speed signal is illustrated in FIG. 2 with a higher level of detail. Accordingly, a test image 8 comprising harvested material on a conveyor element 10 (block 3, corresponds to block 1.1) is firstly captured by the image-capturing unit. After the capturing of the test image 8, according to a first method sequence according to the invention a relevant image section or part of the test image 8 is extracted by means of corresponding filtering or masking. For this purpose, a mask or region of interest (ROI) is predefined on the basis of the position of the image-capturing unit and is used to differentiate sections of the test image 8 which are to be taken into account and ones which are not to be taken into account (block 13.1). A movement characteristic value for a multiplicity of image areas, in particular for each pixel of the image section, is calculated on the basis of the relevant image section of the test image 8 and of the associated test data set (block 13.2). The movement characteristic value comprises in particular a direction of movement. Subsequently, the multiplicity of movement characteristic values is evaluated statistically (block 13.3). For this purpose, the movement characteristic values are each compared with assigned reference characteristic values which are provided from a preferably machine-specific database which can, in particular, be updated (block 13.4), and a difference between said values is calculated, or the movement characteristic values are each compared with a uniform reference characteristic value and a deviation therefrom is calculated. The movement characteristic values or the calculated deviations are evaluated statistically by the evaluation device, in particular a standard deviation of the movement characteristic values from the reference characteristic values is calculated.

A low-pass filter for smoothing the acquired values subsequently passes via the continuously evaluated statistic (block 13.5). A predefined and in particular predefinable filter time constant is used for this (block 13.6), which specifies the degree of smoothing.

A capacity utilization characteristic value, generally denoted by LS, of the conveying line area which is represented in the test image is acquired on the basis of the filtered or smoothed statistic of the deviations described above (block 13.7). Said value represents the movement situation of the harvested material or of the crop flow in the region of the separating device, in particular on the conveyor element or in the transition region between two conveyor elements.

Referring to the second supplementary or alternative path, the relevant test image parts are also firstly extracted (block 2.1). For this purpose, a mask or region of interest (ROI) can be predefined on the basis of the position of the image-capturing unit 6 (block 2.2) and is used to differentiate distances in the test image 8 which are to be taken into account and ones which are not to be taken into account. The calculation of portions of the individual image areas showing components of the harvested material is now performed on the basis of the relevant image section of the test image 8 and of the test data set which is provided for processing (block 2.3). In particular the color information can be evaluated for this purpose. These values can be obtained from a reference table or else specified by an operator (block 2.4).

The deviations of the calculated portions from the threshold value are calculated (block 2.6) on the basis of a threshold value definition (block 2.5). The threshold value is, for example, an ideal value for the respectively considered portion (e.g. root crop, amount of extraneous material 1, amount of extraneous material 2). Subsequently, low-pass filtering is carried out for the purpose of smoothing the acquired deviations (block 2.7). In this context, a filter time constant which is defined according to block 2.8 is used. Subsequently, a further capacity utilization characteristic value LS or the capacity utilization characteristic value LS is calculated on the basis of the smoothed values of the deviations for the individual positions along the conveying line and the respective portions (block 2.9).

Subsequently, the conveying speed signal will be generated on the basis of the capacity utilization characteristic value or values LS, for example by means of a three-point controller, described below (block 2.10).

Figure 3:
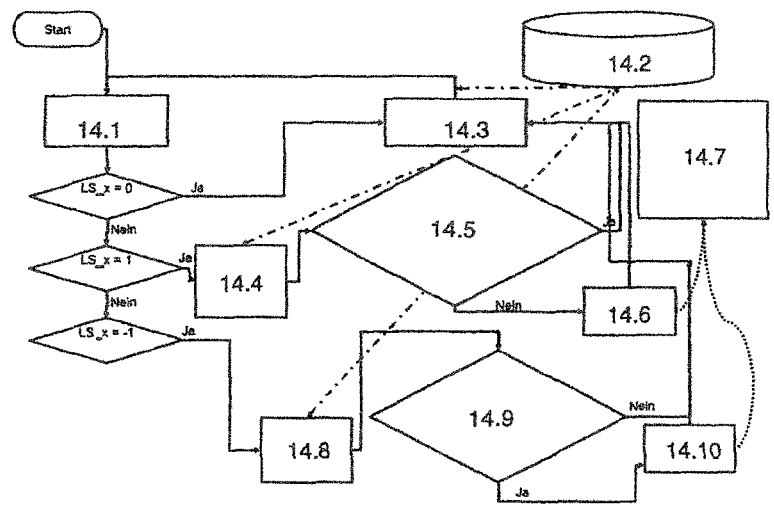
FIG. 3 shows a program sequence diagram of the calculation of the conveying speed signal.

FIG. 3 shows a program sequence diagram of the calculation of the capacity utilization characteristic value LS to form the conveying speed signal. In this embodiment, the capacity utilization characteristic value LS has a value of −1, 0 or 1, and has been generated as described above. After the start of the method, the device listens or waits for a new capacity utilization characteristic value LS (block 14.1). Of course, the respective capacity utilization characteristic values which are also all simply denoted here by "LS", have to be differentiated for the purpose of the programming, and are therefore denoted by LS_x in FIG. 3. After the transfer of the capacity utilization characteristic value, the procedure is continued as a function of the magnitude thereof. A capacity utilization characteristic value LS_x of 0 represents a desired capacity utilization of the separating device, a capacity utilization characteristic value of −1 represents an underload, i.e. excessively low capacity utilization of the separating device, and a capacity utilization characteristic value of 1 represents an overload, i.e. an excessively high capacity utilization with a risk of blockage. If the capacity utilization characteristic value is 0, this is input into the memory 14.2 of the last capacity utilization characteristic values (block 14.3) without a conveying speed signal for changing the conveying speed being output. If the capacity utilization characteristic value is 1, a previous capacity utilization characteristic value which is stored in the memory 14.2 is interrogated (block 14.4) and it is subsequently determined whether an overload has already been detected after the last stored capacity utilization characteristic value of 0 (block 14.5). If this is not the case, the evaluation device outputs a conveying speed signal for reducing the speed (deceleration signal, block 14.6). If this is the case, the new capacity utilization characteristic value is input into the memory 14.2 and no conveying speed signal (a further one which reduces the conveying speed) is output. The speed control according to the invention (block 14.7), i.e. the adaptation of the conveying speed to the capacity utilization of the individual monitored areas of the conveying line or of the separating device, occurs on the basis of the conveying speed signal according to block 14.6.

If the capacity utilization characteristic value has a value of −1, a capacity utilization characteristic value which is input into the memory 14.2 is in turn interrogated (block 14.8), and in accordance with the differentiation described above it is decided whether a conveying speed signal for accelerating the conveying speed is output or has been already output. The program sequence can optionally be optimized by virtue of the fact that an acceleration is triggered only a specific sequence of a number of capacity utilization characteristic values which indicate an underload or insufficient loading. Therefore, for example for the respective areas of the conveying line it is monitored whether an underload is present (block 14.9), and only then is an acceleration pulse emitted (block 14.10).

Figure 4:
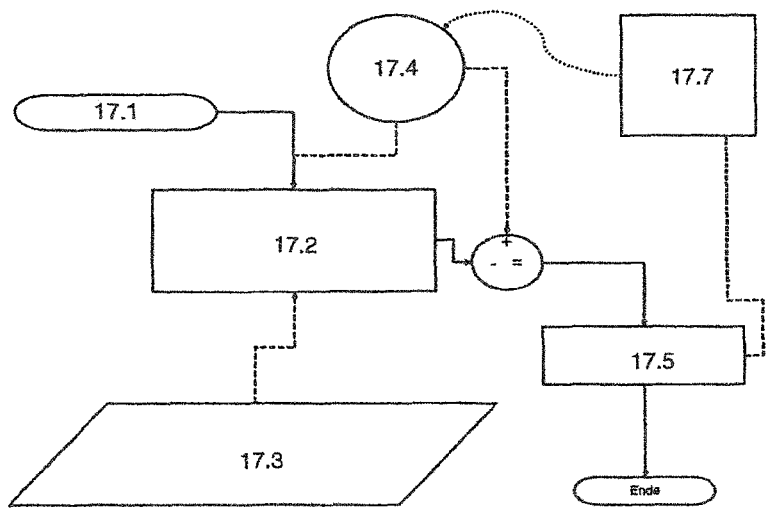
FIG. 4 shows a program sequence diagram of the evaluation of the conveying speed signal.

FIG. 4 shows a program sequence diagram of the evaluation of the conveying speed signal. In the method sequence shown, a conveying speed increment or decrement for changing the conveying speed is calculated (block 17.2) on the basis of the conveying speed signal 17.1. Values such as the degree of the capacity utilization characteristic value can be input into the calculation on the basis of a rule base which is present and can in particular be predefined and varied (block 17.3). Likewise, for the calculation of the increment or decrement it can be taken into account whether the machine is in a fine control range of the speed, e.g. near to the capacity utilization limit (e.g. a difference of less than 10%), or is still in a rough control range further away (e.g. more than 50%) from the capacity utilization limit. The capacity utilization limit can preferably be defined in the evaluation device as that value starting from which an excessively large deviation, which signals blockage of material, occurs.

The conveying speed increment or decrement is converted by the evaluation device into a speed specification for a separating device drive (block 17.5). The resulting conveying speed signal is transmitted to the separating device drive (block 17.6). This results in a conveying speed of the separating device (17.4).

Figure 5:
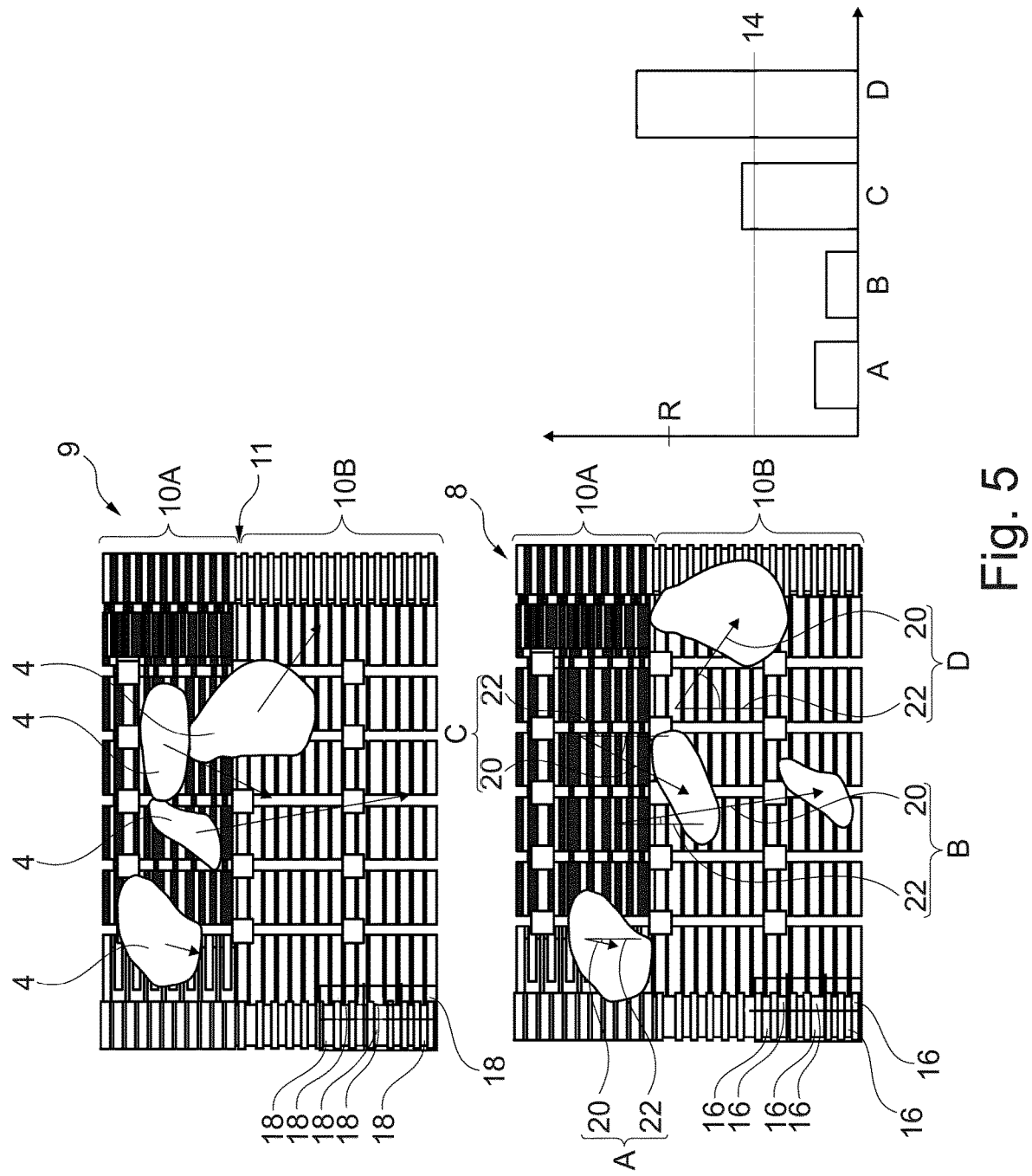
FIG. 5 shows a view of a test image and its partial evaluation.

FIGS. 5 and 6 show, by way of example, the evaluation of individual test images. FIG. 5 is a schematic illustration of an initial image 9 and of a test image 8, each with root crop 4 on a conveying line comprising two conveyor elements 10A and 10B. In the text which follows, conveyor elements are generally also denoted by "10" for the purpose of simplification. A conveyor element 10 is then one or more conveyor elements from the set of conveyor elements (10A, 10B, 10C, 10D, . . . ).

In one preferred embodiment of the method according to the invention, the evaluation device compares the initial image 9 with the test image 8 insofar as directions of movement of objects illustrated in the images are determined. An object does not necessarily characterize a coherent body but rather in the test image 8 merely constitutes an area which can be identified in respect of its movement and which is in particular of the size of an area which is represented by means of one pixel of the test image 8. In particular, in this way the evaluation device therefore calculates a direction of movement for each pixel of the test image 8, assesses its deviation from a reference direction which is known for each area—in particular for each pixel—and evaluates these deviations statistically. FIG. 5 shows, by way of example, a respective calculated direction of movement, in the form of a simultaneously displayed vector for each type of root crop 4, independently of the consideration of the movement at the pixel level. Each arrow represents a movement characteristic value 20.

The movement characteristic values 20 are evaluated statistically for the calculation of the capacity utilization characteristic value LS. In this context, the movement characteristic values 20 merely comprise a direction of movement, and not a movement distance, indicated for example by the length of the arrow. FIG. 5 also shows a histogram with one column per movement characteristic value 20. Each column characterizes here an absolute-value deviation of the corresponding movement characteristic value 20 from a uniform reference characteristic value 22.

In order to calculate a capacity utilization characteristic value LS, indicated by the line 14, in particular a standard deviation of these movement characteristic value deviations from the reference characteristic value 22 is formed. For this purpose, in particular the deviations can in particular be respectively squared and then summed. This sum is then divided by the number of movement characteristic values 20, and the square root of the quotient resulting therefrom is formed. The value which is obtained in this way is the capacity utilization characteristic value LS, which is indicated by way of example in the illustrated histogram.

Figure 9:
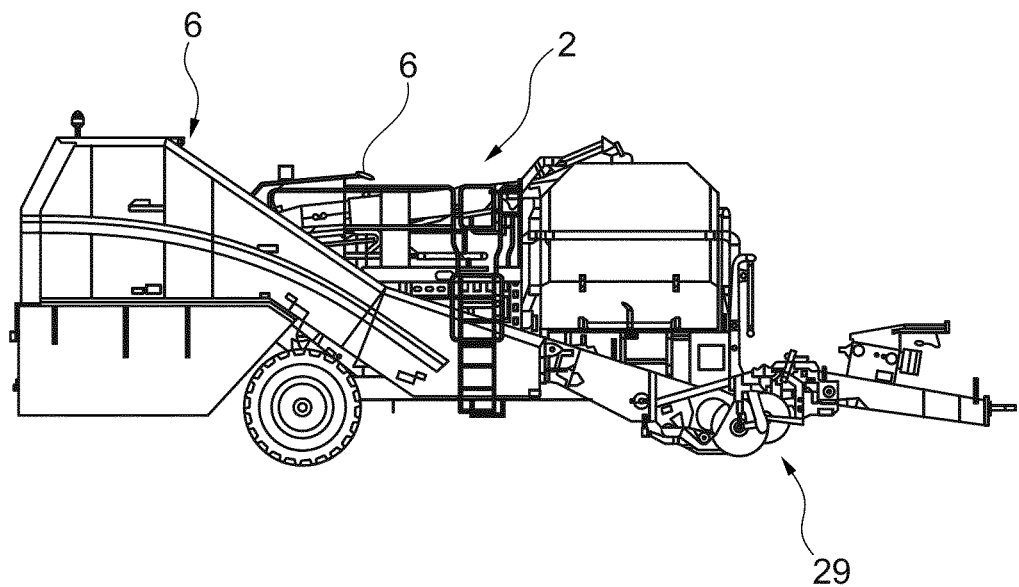

In order to calculate the movement characteristic values 20, first image areas 16 of the test image 8 are advantageously compared with further image areas 18 of the initial image 9, wherein each image area 16, 18 comprises the same number of pixels and is in particular rectangular. For the purpose of simplified illustration, only a few exemplary image areas 16, 18 are illustrated in FIG. 9. Therefore, a movement characteristic value 20 is obtained for each image area 16, in particular for each pixel of the test image 8.

Depending on the conveying line area, it is possible to determine in the evaluation device which capacity utilization brings about a reduction or an increase in the conveying speed. It is therefore possible for example to increase the speed when there is a standard deviation of less than 10°, to maintain the speed when there is a standard deviation of 10° to 20°, and to reduce the conveying speed when there is a larger standard deviation. Accordingly, for the conveyor elements 10A and 10B, embodying a drop step between two screening belts, it is possible to determine, on the basis of the evaluation solely of the detected directions and their standard deviation, whether a blockage of harvested material occurs on the conveyor element 10B which is located below. If a corresponding state, owing for example to a threshold value R indicating a blockage being exceeded, is detected, a conveying speed signal for accelerating the conveyor element 10B is output by the evaluation device, as an alternative to or in addition to a reduction in the conveying speed of the inwardly conveying conveyor element 10A.

FIG. 6 shows by way of example a test image 8 in the upper part of the figure, which image also again shows the transition from the conveyor element 10A to the conveyor element 10B. Root crop 4 and extraneous materials 5 which can comprise stones and weeds are located in this conveying line area. According to the classifiers which are defined in the training of the algorithm or specified by means of a database, for example a table with color values in the HSV format, individual partial image areas 16 are checked for the presence of identical components. Therefore, the assignment of the respective image areas to the individual portions, illustrated by way of example bottom left in FIG. 5, results in a portion distribution of individual portions of root crop 4 and extraneous materials 5 in the test image 8. A1 therefore shows the portion of the root crop 4 in the test image 8 or the corresponding test data set, A2 shows the portion of weeds and A3 shows the portion of stones. This assignment is preferably made on the basis of the color information, preferably also comprising black-and-white and/or gray values of the individual pixels, i.e. an image area 19 which is assigned to a portion corresponds in particular to an area of a pixel. The capacity utilization characteristic value which is denoted generally by LS is based by way of example, and also preferably, on a deviation of the first portion A1 from a threshold value which is again denoted generally by R and indicates an optimum portion distribution of root crop at the observed location on the conveying line. For example, the capacity utilization characteristic value LS is set to 1 when there is a deviation ≥50% from the cleaning threshold value, and to 0 when there is a deviation of <50% from the cleaning threshold value. These values are then correspondingly stored and processed in the further program sequence according to FIGS. 1 to 4.

An arrangement of the optical image-capturing units 6 is disclosed in FIG. 8. The machine 2 according to the invention is embodied as a towed potato harvester, wherein a multiplicity of conveyor elements 10 and their associated separating devices are secured by means of a machine frame 12, which is only partially designated. Along the conveying line there are a multiplicity of image-capturing units 6 which capture images of the harvested material which is transported on the conveyor elements 10 and comprises root crop 4. The optical image-capturing units 6 form individual measuring points for monitoring the respective separating devices.

The positions of image-capturing units 6 which are indicated in FIG. 7 are an area directly after a grubbing device 29 (measuring point MS1), a transition from a first conveyor element 10A in the form of a screening belt to a second conveyor element 10B in the form of a screening belt which is additionally surrounded by a coarse weed belt (measuring point MS2), the transition from this second screening belt 10B to a further conveyor element 10C comprising a further separating device (measuring point MS3). Moreover, on the output side of this separating device a conveyor element 10E which leads to the sorting table and has a further image-capturing unit 6 (measuring point MS4) is monitored, wherein at the same time images of a further conveyor element 10F which is provided for residues of extraneous materials 5, in particular stones, are captured. Finally, a further optical image-capturing unit 6 (measuring point MS5) is present at the sorting table 45.

An evaluation device can be positioned at any desired centrally accessible location, but preferably in the vicinity of the sorting table. Information relating to the setting of the separating devices can be sent to an operator on a tractor vehicle from the evaluation device, for example via a cable 12.1 which can be seen in FIG. 7.

The machine 2 which is illustrated in the side view in FIGS. 8 and 9 clarifies the positions of the optical image-capturing units 6. In particular, the image-capturing unit 6 which is located at the sorting table 45 can be arranged directly at a drop step leading to a bunker 33.

Figure 10:
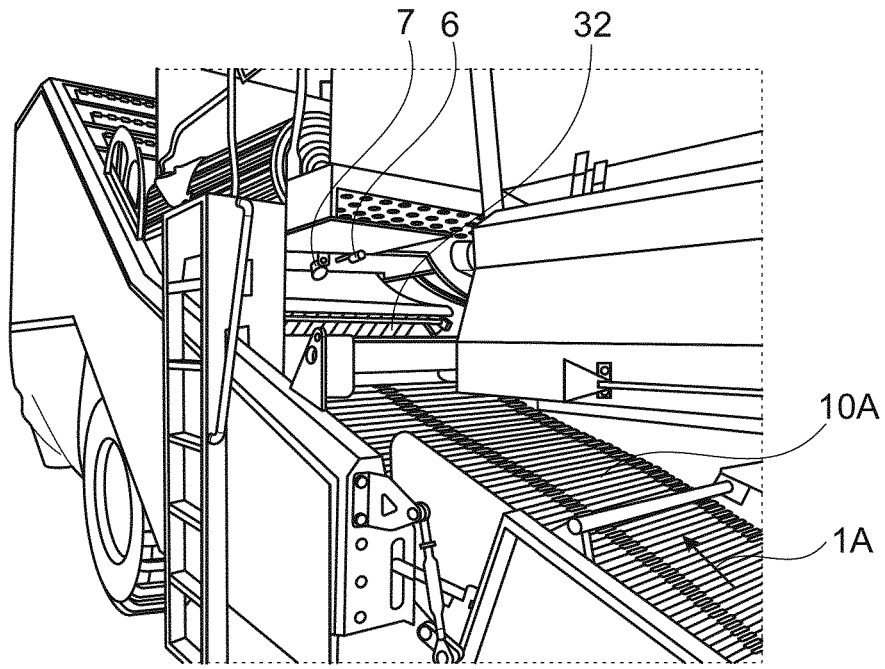
FIG. 10 shows a partial view of the subject matter according to FIG. 7 with a conveyor element.
Figure 11:
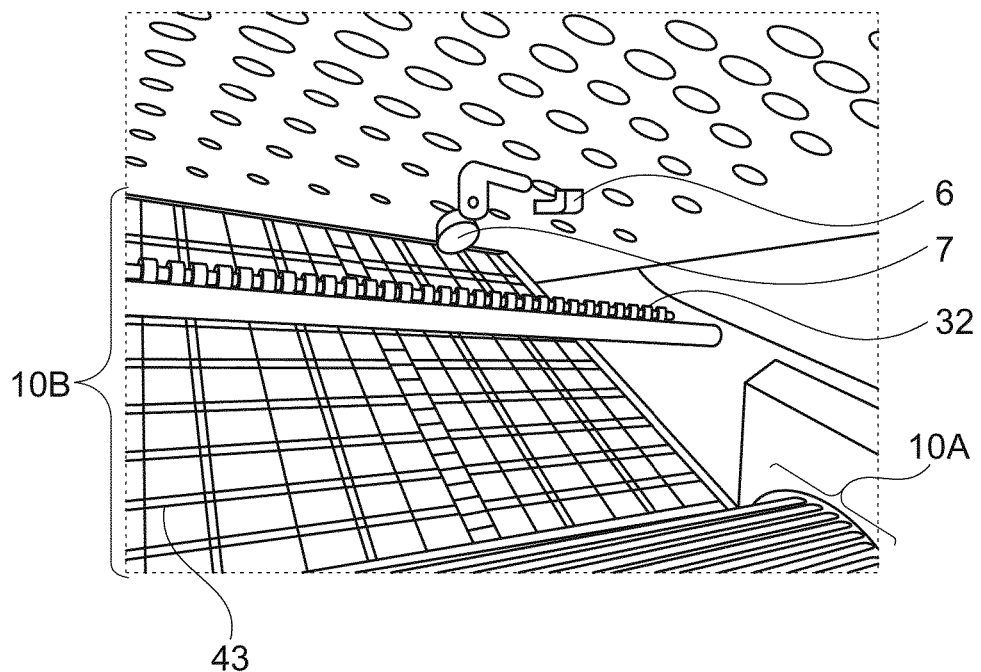
FIG. 11 shows a view of a detail of an area of the device according to FIG. 7 which is partially illustrated in FIG. 10.

FIGS. 10 and 11 show the arrangement of an optical image-capturing unit 6 which is arranged on the frame above a first drop step between a conveyor element 10A and a conveyor element 10B and whose field of vision is directed downward (measuring point 2). A light source 7 ensures that the field of vision is illuminated in order to capture a sufficiently lit test image 8. The conveyor element 10A is a screening belt which already screens out some of the extraneous materials 5, in particular earth, coming from a grubbing device 29 and transfers them to a further conveyor element 10B, embodied as a screening belt, via a drop step. This conveyor element 10B additionally has a coarse weed belt which is provided for separating off the weeds present with the potatoes or in the harvested material. Stripping devices 32 are correspondingly arranged over the width of the conveyor element 10B.

A height H of the stripping device 32 above the conveying plane of the conveyor element 10B can also be set. The conveying speeds of the conveyor elements 10A and 10B can be set by means of the method according to the invention. FIG. 11 illustrates only one coarse weed belt 43, and not the actual conveyor element 10B (cf. FIG. 13), embodied in the form of a screening belt, for purposes of clarity.

Figure 12:
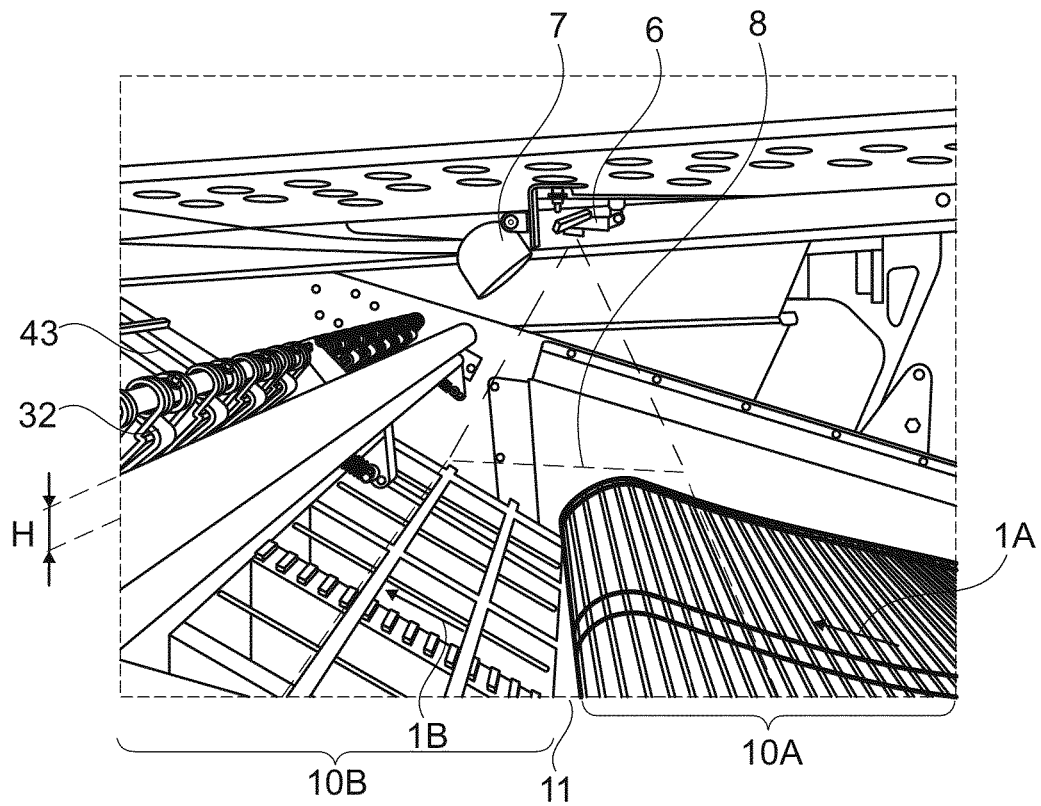
FIG. 12 shows the subject matter according to FIG. 11 from a different perspective.
Figure 13:
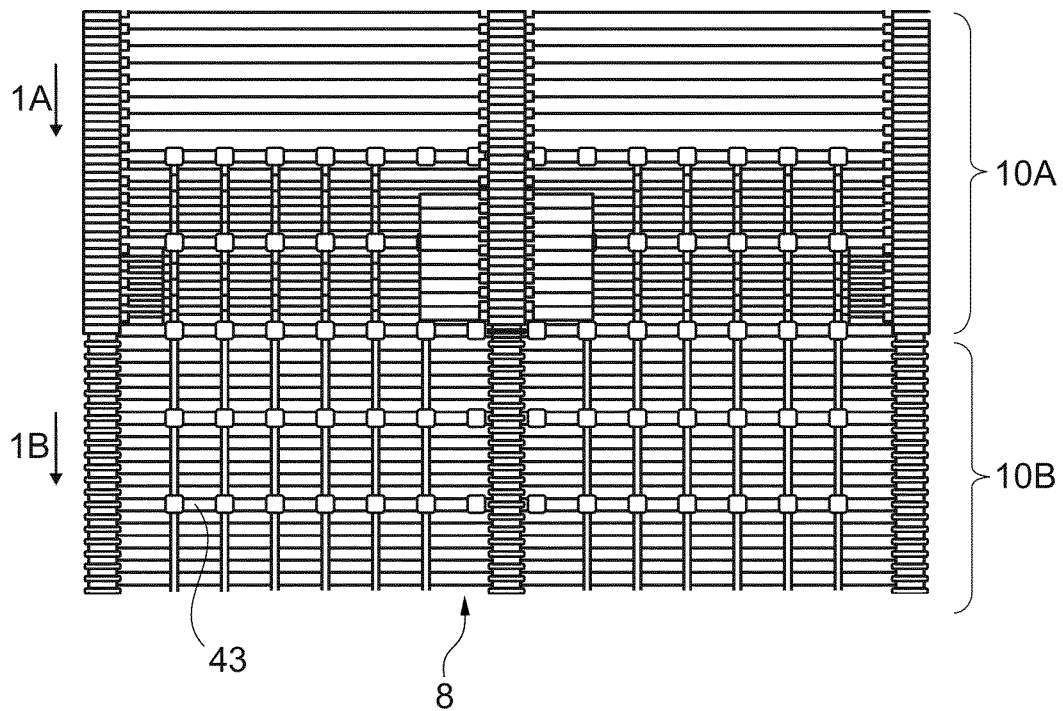
FIG. 13 shows an illustration of the test image of the image-capturing unit according to FIG. 11.

A test image 8 which is obtained from the field of vision of the optical image-capturing unit 6, which is shown by means of dashes in FIG. 12, is illustrated in detail (without harvested material) in FIG. 13. The evaluations described above are made using a test data set provided from this test image 8 on the basis of the detected directions of movement of the harvested material and/or on the basis of the respective portions of the components of harvested material, and when necessary the conveying speeds of the conveyor elements are adjusted.

The harvested material which is still present is transferred from the conveyor element 10B to a further conveyor element 10C with a conveying direction 1C. A separating device in the form of a plurality of rotating deflection rollers 24 which are positioned one above the other is assigned to said further conveyor element 10C. The harvested material is transported in the direction of the conveyor element 10D (FIG. 14) by means of a pulse which is applied by said separating device.

A distance H between a conveyor element 10C and the lower deflection roller 24 can be set by the operating personnel for the purpose of varying a separating performance. The speeds of at least the inward conveying conveyor element 10C and outward conveying conveyor element 10D, which are embodied as screening belts, can be varied by means of the method according to the invention. In addition, according to one advantageous development the separating performance or deflection can be varied by virtue of the adjustability of the circulation speeds of the deflection rollers 24.

Figure 14:
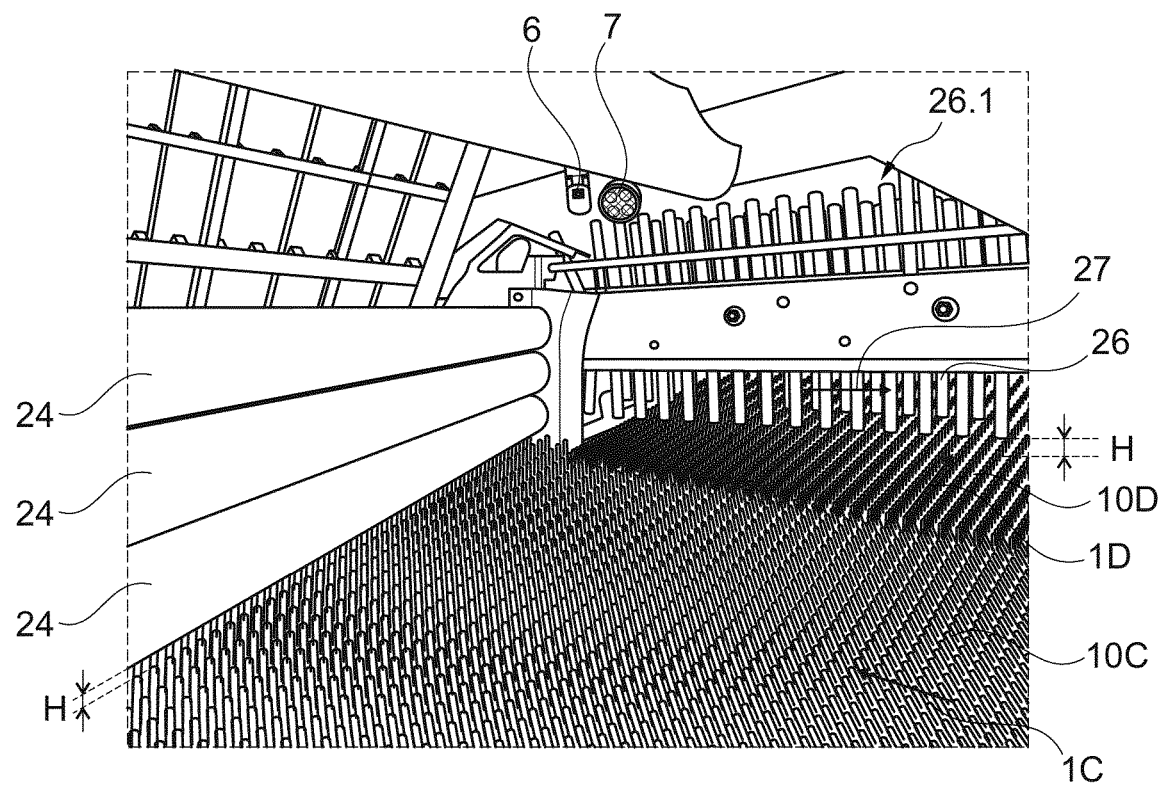
FIG. 14 shows a separating device of the machine according to FIG. 7 with an image-capturing unit.
Figure 15:
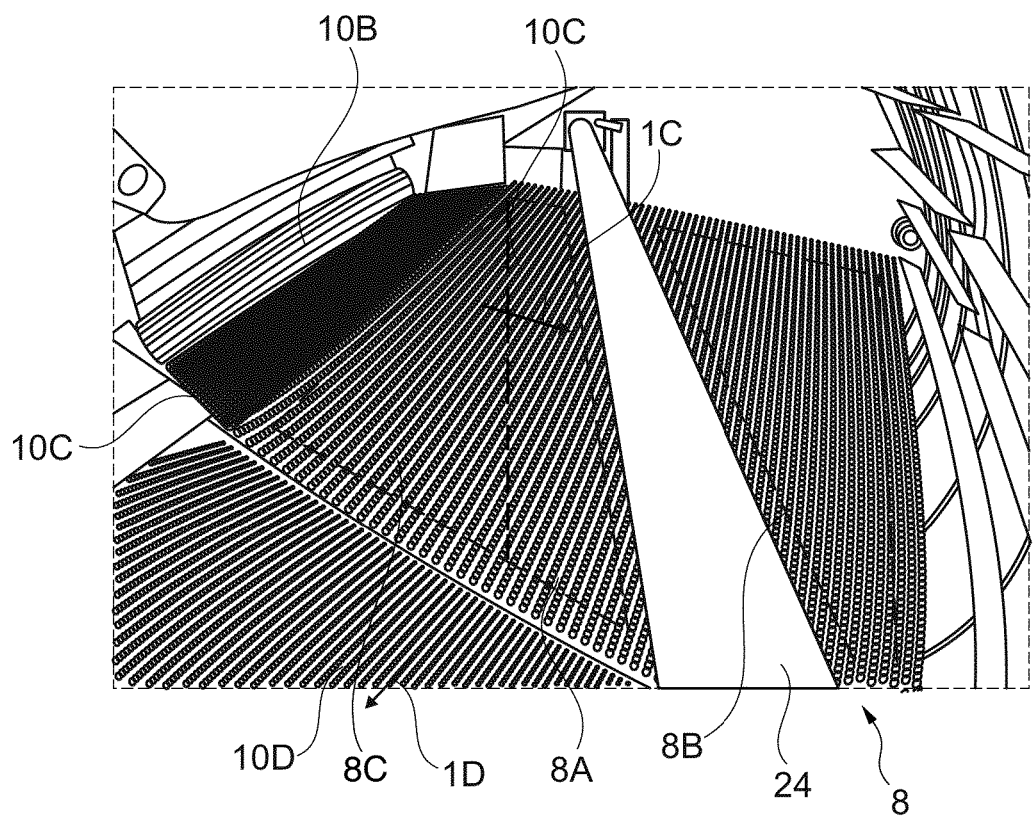
FIG. 15 shows a schematic test image captured from the perspective of the image-capturing unit shown in FIG. 14.

The image-capturing unit 6 illustrated in FIG. 14 generates the test image which is illustrated in FIG. 15 and in which a test image part 8A is defined by means of filtering or masking. In addition, a test image part 8B, which is located behind the deflection rollers 24 when viewed from a conveying direction 1C, is also defined by filtering. Therefore, the areas of the conveyor element 10C which are located upstream and downstream of the separating element formed by the deflection rollers 24 are monitored for the setting of the conveying speed. Respective test data sets can be produced for the two image areas 8A and 8B, and the respective evaluations for the two image areas 8A and 8B can result from the corresponding partial areas of a test data set.

Insofar as an associated setpoint value for the test image part 8A reveals accumulation of material upstream of the deflection rollers 24, the conveying speed of the conveyor element 10C is increased.

Alternatively, the evaluation can be based only on the areas 8A and 8C which are located upstream of the deflection rollers 24, are surrounded by dashed lines and are adjacent to another. Permissible densities of portions can be defined for these two areas, for example by means of the respective threshold values R. Starting from the upward transgression of e.g. a portion of, for example, root crop 4 which is associated with excessive accumulation directly upstream of the deflection rollers, the inward conveying belt 10C can be made to run more quickly, and alternatively or additionally an outward conveying belt can be made to run more quickly.

A height H of the lower ends of fingers 26 of a separating device which is embodied as a finger web 26.1 can also be settable as one of a plurality of operating parameters by the operating personnel. The height H describes the distance between the fingers 26 and the upper edge of the conveyor element which is embodied as a hedgehog web. Moreover, an attitude angle of the finger web 26.1 can be configured in such a way that it can be set with respect to a vertical to the conveying plane of the conveyor element. The same applies to the circulation speed of the finger web 26.1.

Figure 16:
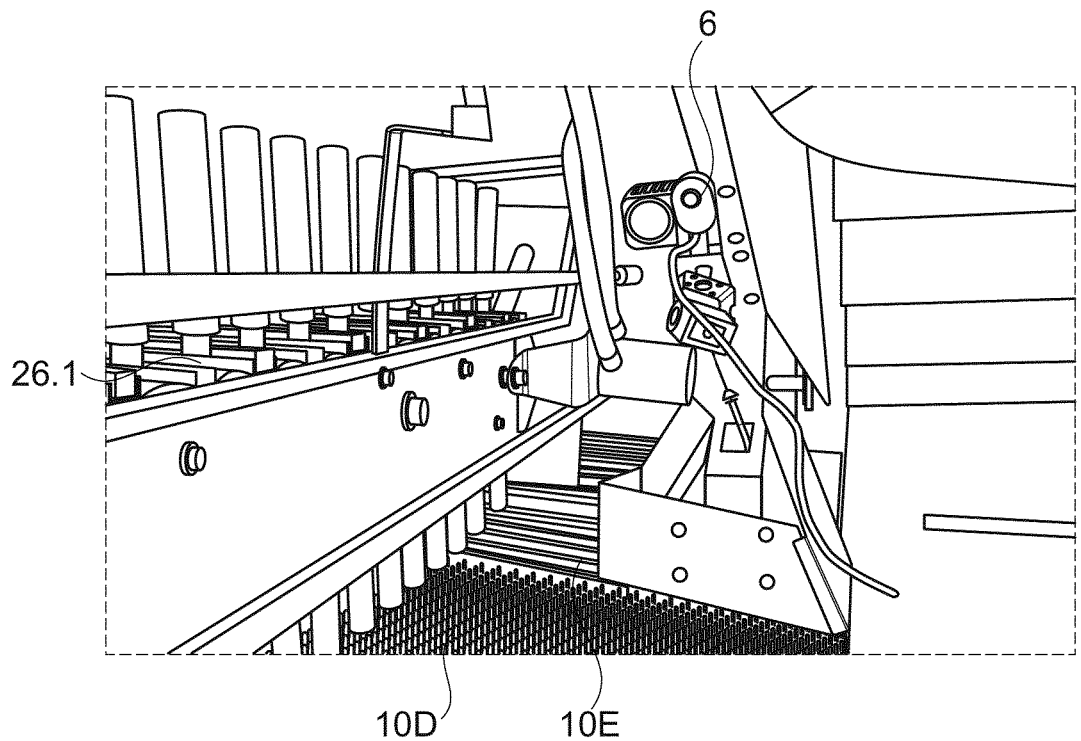
FIG. 16 shows a further separating device of the machine according to FIG. 7 with an image-capturing unit.
Figure 17:
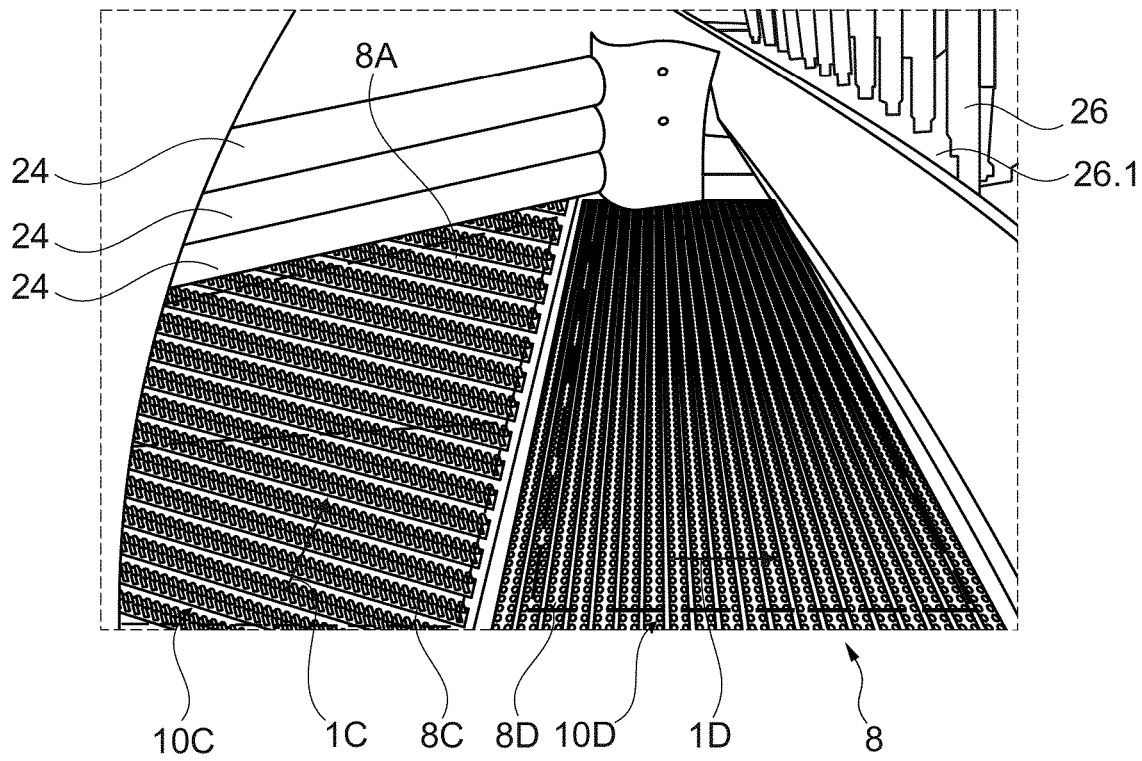
FIG. 17 shows a schematically illustrated test image captured from the perspective of the image-capturing unit shown in FIG. 16.

A further optical image-capturing unit 6, which is arranged in the area of the conveyor belts 10C and 10D is illustrated in FIG. 16. This image-capturing unit 6 can be used, in addition to the image-capturing unit according to FIG. 14, to monitor the transportation of harvested material in the test image area 8D. In particular, the image-capturing unit 6 therefore serves to monitor the effect of the separating and deflection device which is embodied by the deflection rollers 24. In particular, the conveying speed of the conveyor element 10D can be adapted as a function of the results of the evaluation of the test images 8 of the optical monitoring unit 6 according to FIG. 14. The monitoring unit 6 according to FIG. 16 is also assigned a light source 7 for better illuminating the monitored area 8D.

Figure 18:
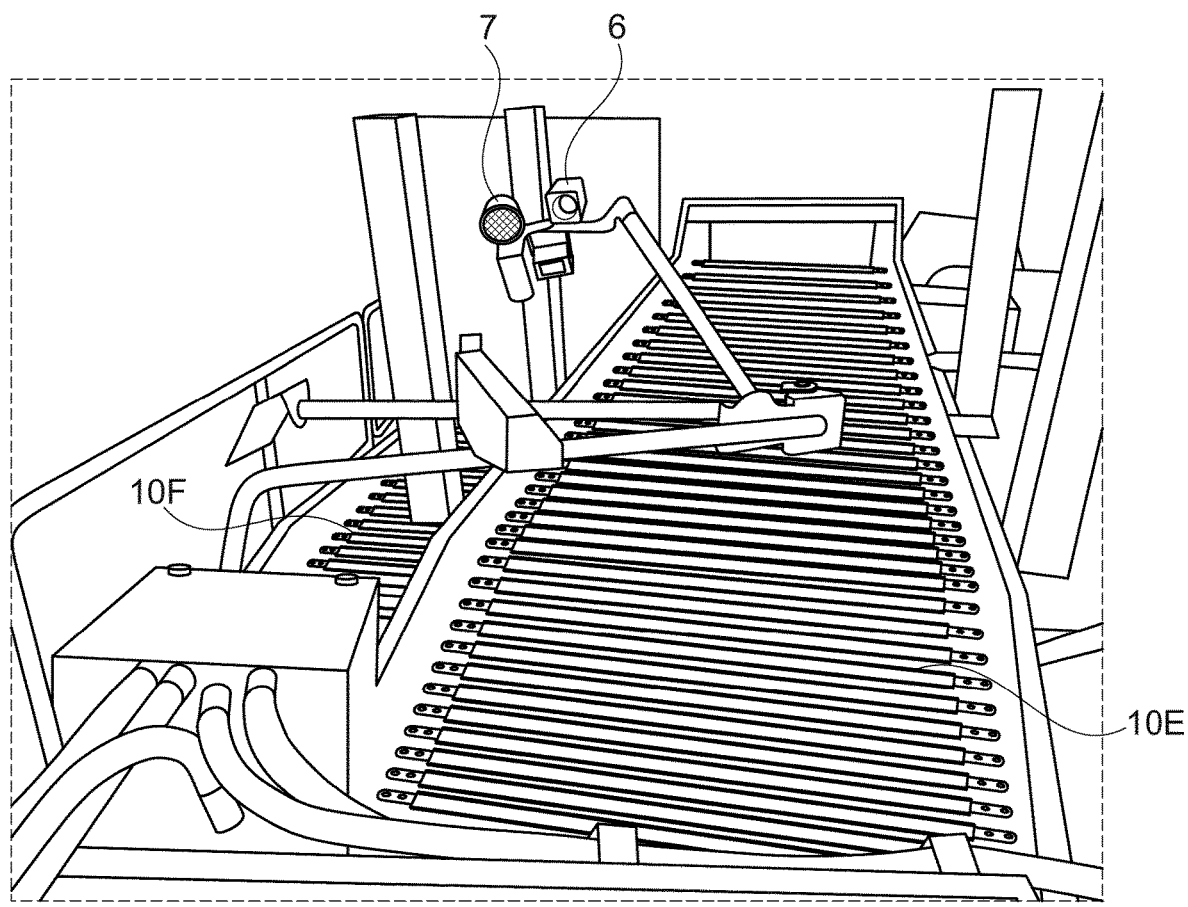
FIG. 18 shows a further view of a detail of a machine according to FIG. 7 with a further image-capturing unit.
Figure 19:
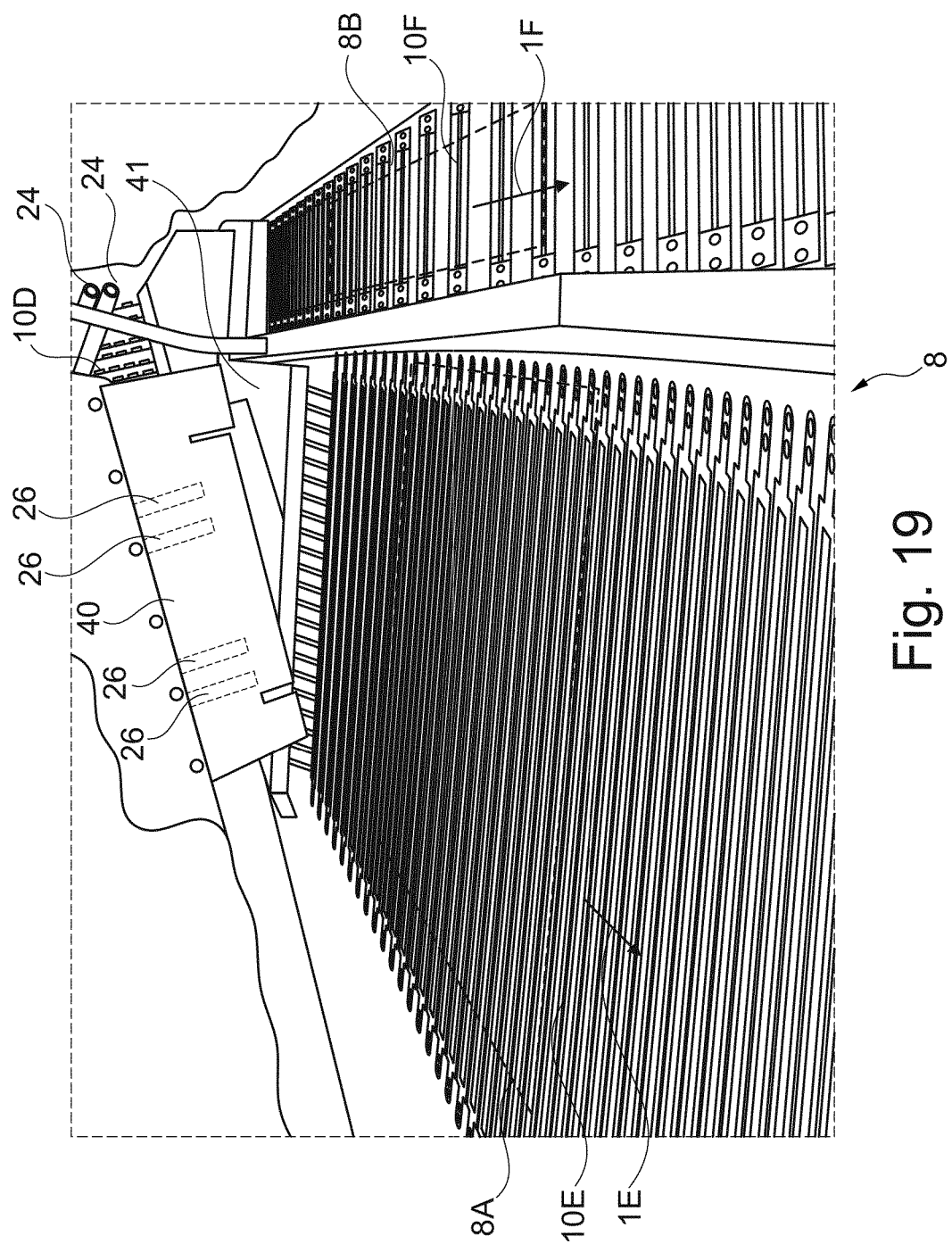
FIG. 19 shows a schematic illustration of a test image considered from the perspective of the image-capturing unit according to FIG. 18.

A further optical image-capturing unit 6 is arranged with an associated light source 7 above a sorting table with a view of a conveyor element 10E and a conveyor element 10F (FIG. 18). In this context, as described above, perspective correction is performed on the basis of the "fisheye" representation of the image-capturing unit 6. By means of masking, the test image parts 8A and 8B which are represented in the test image 8 according to FIG. 19 are selected, and, on the one hand, monitor the conveyor element 10E, as a conveying path, with a conveying direction 1E for transporting away root crop and, on the other hand, monitor the conveyor element 10F, as a further conveying path, with a conveying direction 1F for transporting away extraneous materials 5 in the form of stones. By means of the evaluation described above it is checked whether the portions of root crop 4 on the conveyor element 10F are too large. If this is the case, the conveyor element 10D connected upstream is given a slower setting by means of the method according to the invention, by means of the evaluation device. In addition, in one development of the invention the finger web 26.1, which is illustrated above the conveyor element 10D embodied as a hedgehog web, can be adapted with respect to its separating effect as a function of corresponding control specifications, said finger web 26.1 having fingers 26 (illustrated by dashed lines by way of example) behind the cover 40 located in front of them. For example, the distance between the fingers 26 and the conveyor element 10D is reduced in order to convey away a greater amount of harvested material, in the form of root crop 4, onto the conveyor element 10E via an associated chute 41.

FIG. 20 illustrates the arrangement of measuring points MS1 to MS5 having optical image-capturing units 6 on a schematically illustrated conveying line of a machine 2 embodied as a beet lifter. The image-capturing units 6 are arranged downstream of a grubbing device 29 above a roller table 10M and at the end of a conveyor element 10N which is embodied as a screening belt (measuring points MS1 and MS2). A further optical image-capturing unit 6 monitors in particular a conveyor element 10P which is embodied as a screening star (measuring point MS3). The subsequent conveyor element 10Q which is embodied as a screening star is also monitored in precisely the same way as a conveyor element 10R which is embodied as a ring elevator (measuring points MS4 and MS5). If e.g. a blockage at one of the conveyor elements 10M, 10N, 10P, 10Q, 10S is detected, this conveyor element can be made to run more quickly at the instigation of the evaluation device. This can be done according to one of a plurality of possible control scenarios, initially only for a specific time up to subsequent checking, or can take place until monitoring reveals that the critical state has been eliminated.

The invention claimed is:

1. A method for controlling the operation of a machine for harvesting root crop, the method comprising the steps of:
   capturing, via at least one optical image-capturing unit, at least one image of harvested material comprising root crop which is moved along relative to a machine frame by a conveyor element;
   generating a data set formed using the image or by the image;
   generating, via an evaluation device, a signal for setting a speed of the conveyor element based on the data set and independent of a speed of the harvested material; and
   setting the speed of the conveyor element based on the signal,
   wherein the evaluation device compares the data set with an initial data set which is generated on the basis of an initial image or formed from the initial image.

2. The method as claimed in claim 1, wherein the signal is also determined independently of the speed of the conveyor element.

3. The method as claimed in claim 1, wherein the data set from a first execution of the method serves as an initial data set for a further execution of the method.

4. The method as claimed in claim 1 wherein the evaluation device determines the signal on the basis of an evaluation of the optical flow of the harvested material which is obtained from the data set and the initial data set.

5. The method as claimed in claim 1, wherein the evaluation device calculates at least one movement characteristic data set which characterizes a movement of at least one object which is at least partially represented by the image, wherein the signal is generated on the basis of the movement characteristic data set.

6. The method as claimed in claim 5, wherein the evaluation device generates in each case a movement characteristic data set for different objects which are represented with the image or different, first partial image areas.

7. The method as claimed in claim 6, wherein the evaluation device calculates, in a first calculation step for a multiplicity of partial image areas comprising at least a first number of pixels, in each case a movement characteristic data set, and calculates in a later calculation step, taking into account the movement characteristic data sets calculated in the first calculation step, in each case a further movement characteristic data set for a relatively high number of different partial image areas, which comprise a relatively low number of pixels.

8. The method as claimed in claim 5, wherein the evaluation device calculates a capacity utilization characteristic value (LS) on the basis of at least one movement characteristic value, characterizing a direction of movement, of the at least one movement characteristic data set.

9. The method as claimed in claim 8, wherein the evaluation device statistically evaluates a plurality of movement characteristic values, which are included in different movement characteristic data sets, in order to calculate the capacity utilization characteristic value (LS).

10. The method as claimed in claim 8, wherein the capacity utilization characteristic value (LS) is determined by a deviation, calculated by the evaluation device, of the first portion (A1) from a threshold value (R).

11. The method as claimed in claim 8, wherein the signal is calculated using a multiplicity of capacity utilization characteristic values (LS), or at least one previously calculated capacity utilization characteristic value (LS) is input into the calculation of the capacity utilization characteristic value (LS).

12. The method as claimed in claim 1, wherein the evaluation device calculates at least one first portion (A1), formed by at least one image area, of the image, wherein the at least one image area represents at least partially a defined component of the harvested material or of the machine.

13. The method as claimed in claim 12, wherein the at least one image area, which forms the first portion (A1), is identified, on the basis of a data subset which is generated using the image area, as the defined component of the harvested material or the machine.

14. The method as claimed in claim 12, wherein the data subset is classified by statistical classification method, and an image area is classified as being associated with the first portion (A1).

15. The method as claimed in claim 14, wherein when exemplary image areas, which can be classified as being associated with the first portion (A1), of a reference image are input, the evaluation device automatically further develops a model on which the classification method is based and/or automatically calculates or changes the at least one reference value range.

16. The method as claimed in claim 12, wherein the at least one value of the data subset is compared with at least one reference value, and an image area is classified as being associated with the first portion (A1).

17. The method as claimed in claim 12, wherein different image areas are weighted differently during the calculation of the first portion (A1).

18. The method as claimed in claim 12, wherein the entire test image or a coherent image part is divided into partial image areas.

19. The method as claimed in claim 12, wherein the image comprises a plurality of test image parts for which the evaluation device respectively calculates a first portion (A1).

20. The method as claimed in claim 12, wherein the image areas which form the first portion (A1) show root crop or parts thereof and image areas which form a second portion show extraneous materials or parts thereof.

21. The method as claimed in claim 1 transmits sensor data to the evaluation device, which data is input into the calculation of the signal.

22. The method as claimed in claim 1, wherein the evaluation device triggers either an increase or a reduction in the speed of the conveyor element based on different signals.

23. The method as claimed in claim 22, wherein a gradient in the speed of the conveyor element, which is triggered by one or more of the signal, a difference between an upstream speed of the conveyor element and a downstream speed of the conveyor element, an acceleration, or a deceleration, is dependent on the capacity utilization characteristic value (LS).

24. The method as claimed in claim 22, wherein after the triggering of a change in the speed of the conveyor element, no further change in the speed of the conveyor element is triggered for a defined time period or a defined conveying distance.

25. The method as claimed in claim 1, wherein the signal is transmitted in a wired fashion—or in a wireless fashion, to a control unit.

26. The method as claimed in claim 1, wherein the evaluation device evaluates the data set locally on the machine or on a directly connected tractor vehicle.

27. A machine for harvesting root crop, the machine comprising:
   at least one machine frame,
   at least one conveyor element,
   at least one optical image-capturing unit and
   one evaluation device;
   wherein the machine is operable to perform the method recited in claim 1.

28. The machine as claimed in claim 27, wherein the evaluation device comprises a graphic processor unit.

29. The machine as claimed in claim 27, further including at least one sensor which is coupled to the evaluation device.

30. The machine as claimed in claim 27, further including a plurality of image-capturing units which during operation each capture at least one image of the same conveyor element or of different conveyor elements.

31. The machine as claimed in claim 27, wherein the conveyor element is embodied as a screening belt or hedgehog web, or a screening star (10P, 10Q, 10S) or conveyor roller.

32. The machine as claimed in claim 27, wherein the image-capturing unit is arranged in such a way that the image shows at least two alternative conveying paths for different components of harvested material.

* * * * *